United States Patent [19]

Mizoguchi et al.

[11] Patent Number: 5,274,395
[45] Date of Patent: Dec. 28, 1993

[54] THERMAL TRANSFER RECORDING APPARATUS SWITCHABLE BETWEEN SUBLIMABLE AND FUSIBLE INK SHEETS

[75] Inventors: Yoshiyuki Mizoguchi; Yoshitaka Watanabe; Koichi Tanno, all of Kawasaki; Keiichi Ikeda, Yokohama; Ikumasa Ikeda, Kawasaki; Hideaki Kawamura, Kawasaki; Hideo Takiguchi, Kawasaki; Jun Kawai; Mayumi Yamamoto, both of Tokyo, all of Japan

[73] Assignee: Canon Kabushiki Kaisha, Tokyo, Japan

[21] Appl. No.: 908,427

[22] Filed: Jun. 30, 1992

Related U.S. Application Data

[63] Continuation of Ser. No. 380,446, Jul. 17, 1989, abandoned.

[30] Foreign Application Priority Data

| Jul. 18, 1988 | [JP] | Japan | 63-177176 |
| Jul. 18, 1988 | [JP] | Japan | 63-177177 |
| Jul. 18, 1988 | [JP] | Japan | 63-177178 |
| Jul. 18, 1988 | [JP] | Japan | 63-177179 |
| Jul. 18, 1988 | [JP] | Japan | 63-177180 |
| Jul. 18, 1988 | [JP] | Japan | 63-177181 |

[51] Int. Cl.$^5$ ............................... B41J 2/32
[52] U.S. Cl. .................... 346/76 PH; 400/120
[58] Field of Search ............ 346/76 PH; 400/120, 400/605

[56] References Cited

U.S. PATENT DOCUMENTS

| 4,569,608 | 2/1986 | Watanabe | 400/208 |
| 4,632,585 | 12/1986 | Oyamatsu et al. | 400/613 |
| 4,709,149 | 11/1987 | Takahashi et al. | 250/317.1 |
| 4,851,861 | 7/1989 | Kikuchi et al. | 346/76 PH |
| 4,890,120 | 12/1989 | Sasaki et al. | 346/76 PH |

FOREIGN PATENT DOCUMENTS

| 0256502 | 2/1987 | European Pat. Off. | |
| 0063494 | 4/1983 | Japan | 400/120 |
| 0093376 | 5/1984 | Japan | 400/120 |
| 0274971 | 12/1986 | Japan | 400/120 |
| 62-179975 | 8/1987 | Japan | |

Primary Examiner—Benjamin R. Fuller
Assistant Examiner—Huan Tran
Attorney, Agent, or Firm—Fitzpatrick, Cella, Harper & Scinto

[57] ABSTRACT

A recording apparatus for performing recording on a recording medium includes a mounting unit, a discriminating unit, a recording unit, and a control unit. The mounting unit detachably mounts an ink sheet, the discriminating unit discriminates a kind of ink sheet mounted in the mounting unit. The recording unit performs recording on the recording medium and has a plurality of recording elements. The control unit performs drive control of the recording elements on the basis of a discrimination result of the discriminating unit.

10 Claims, 21 Drawing Sheets

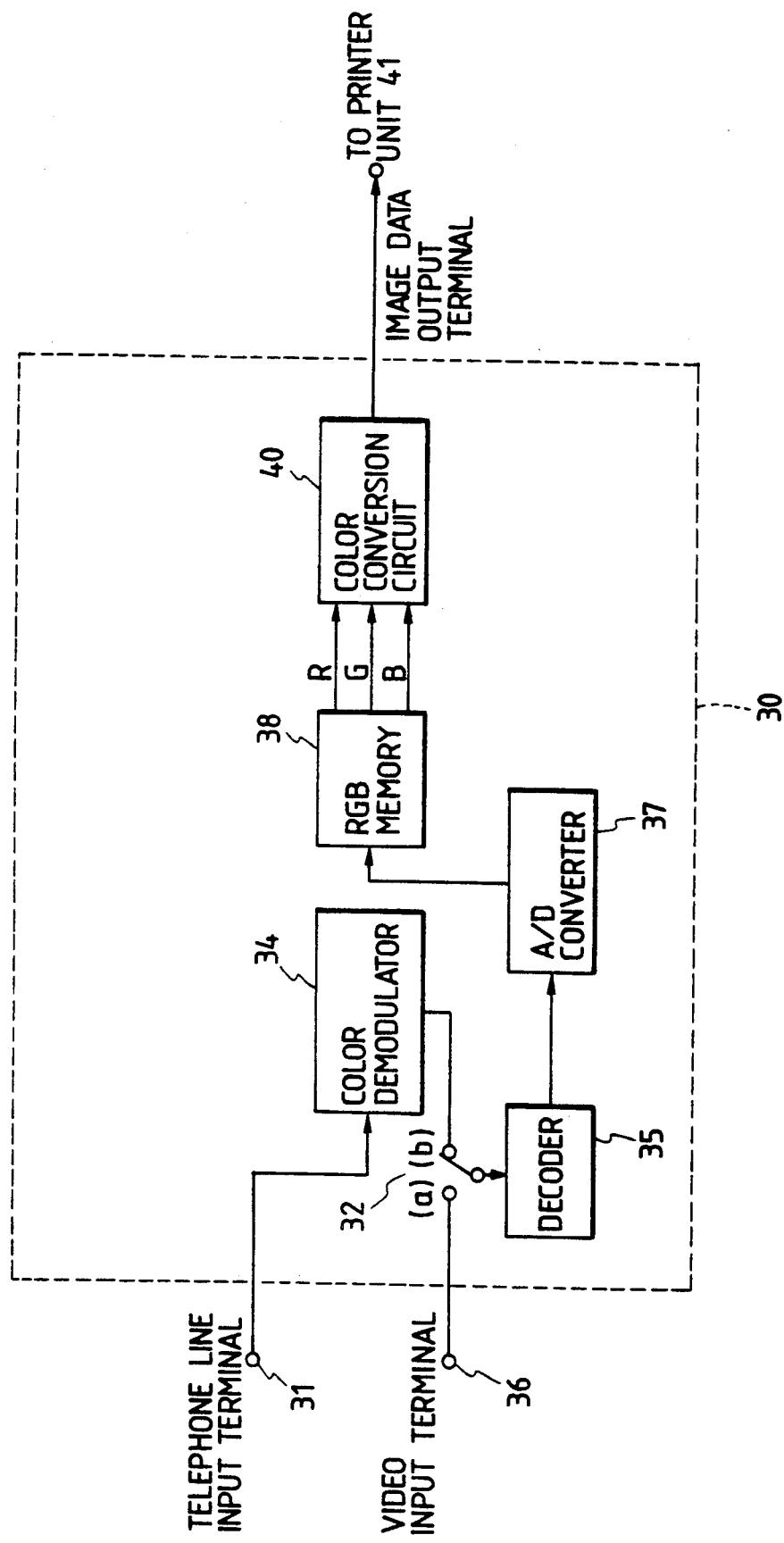

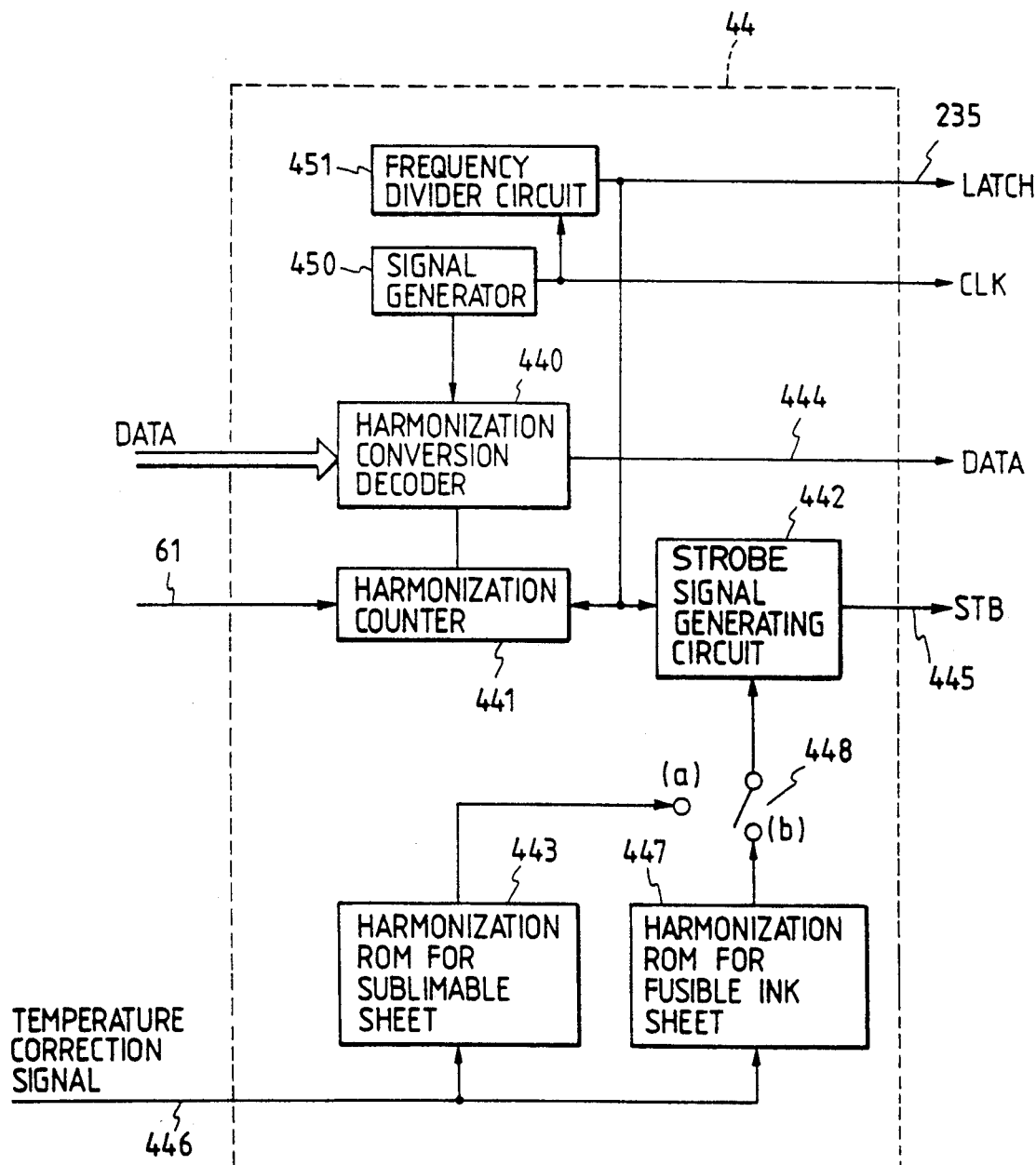

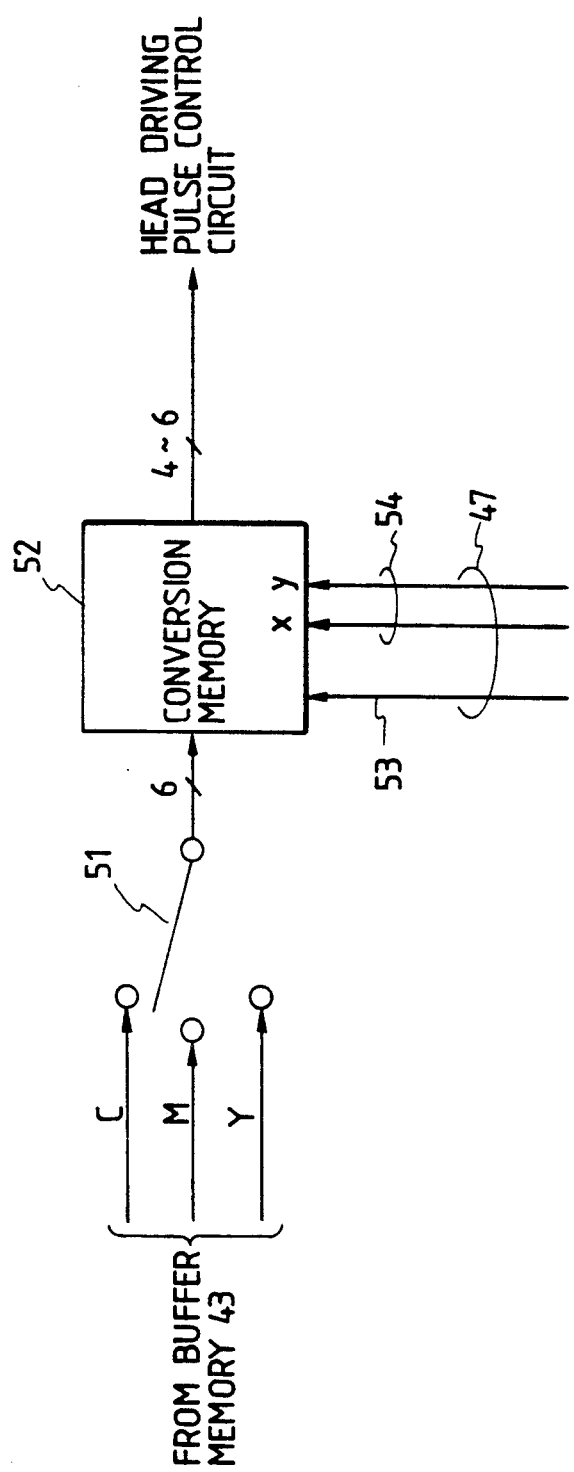

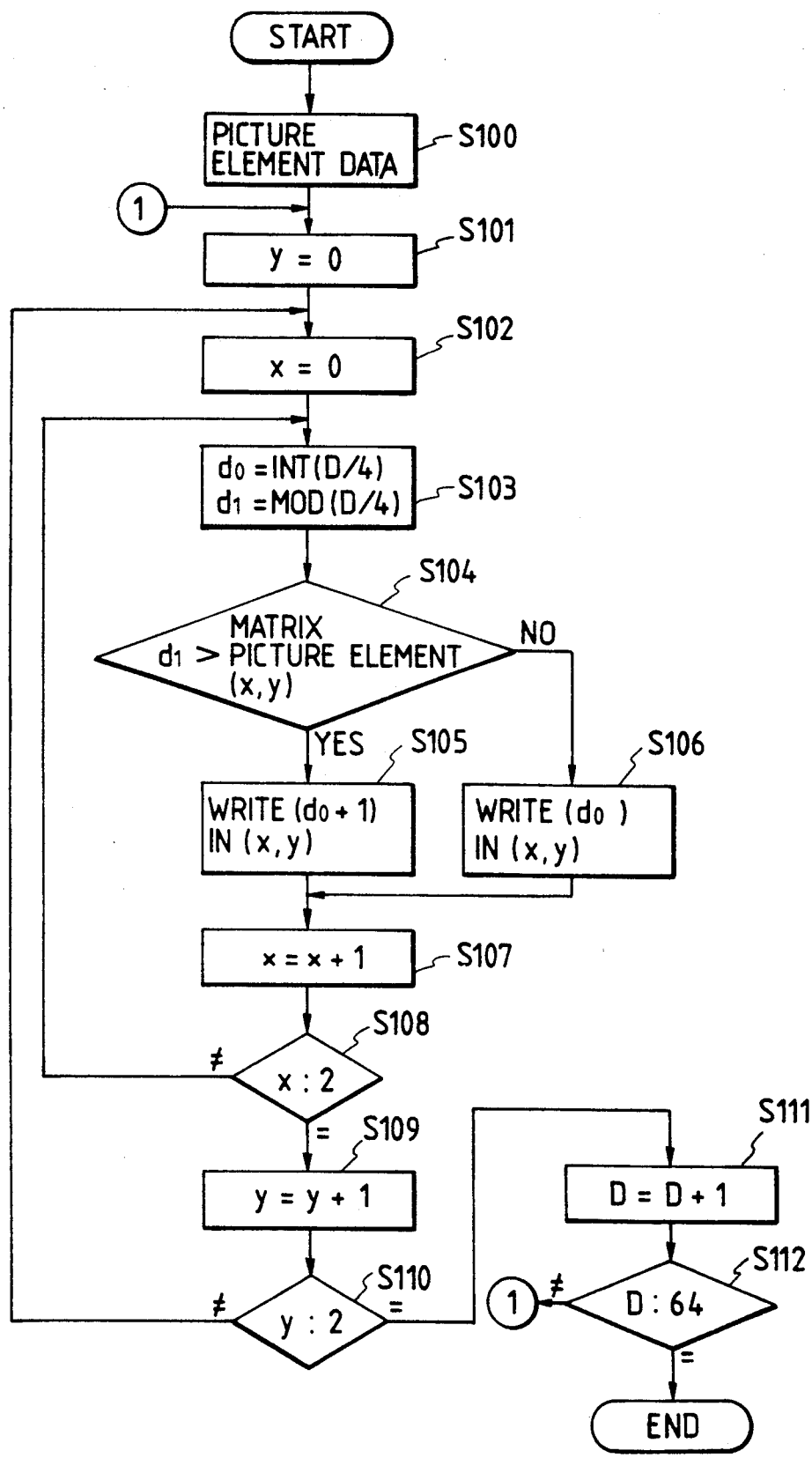

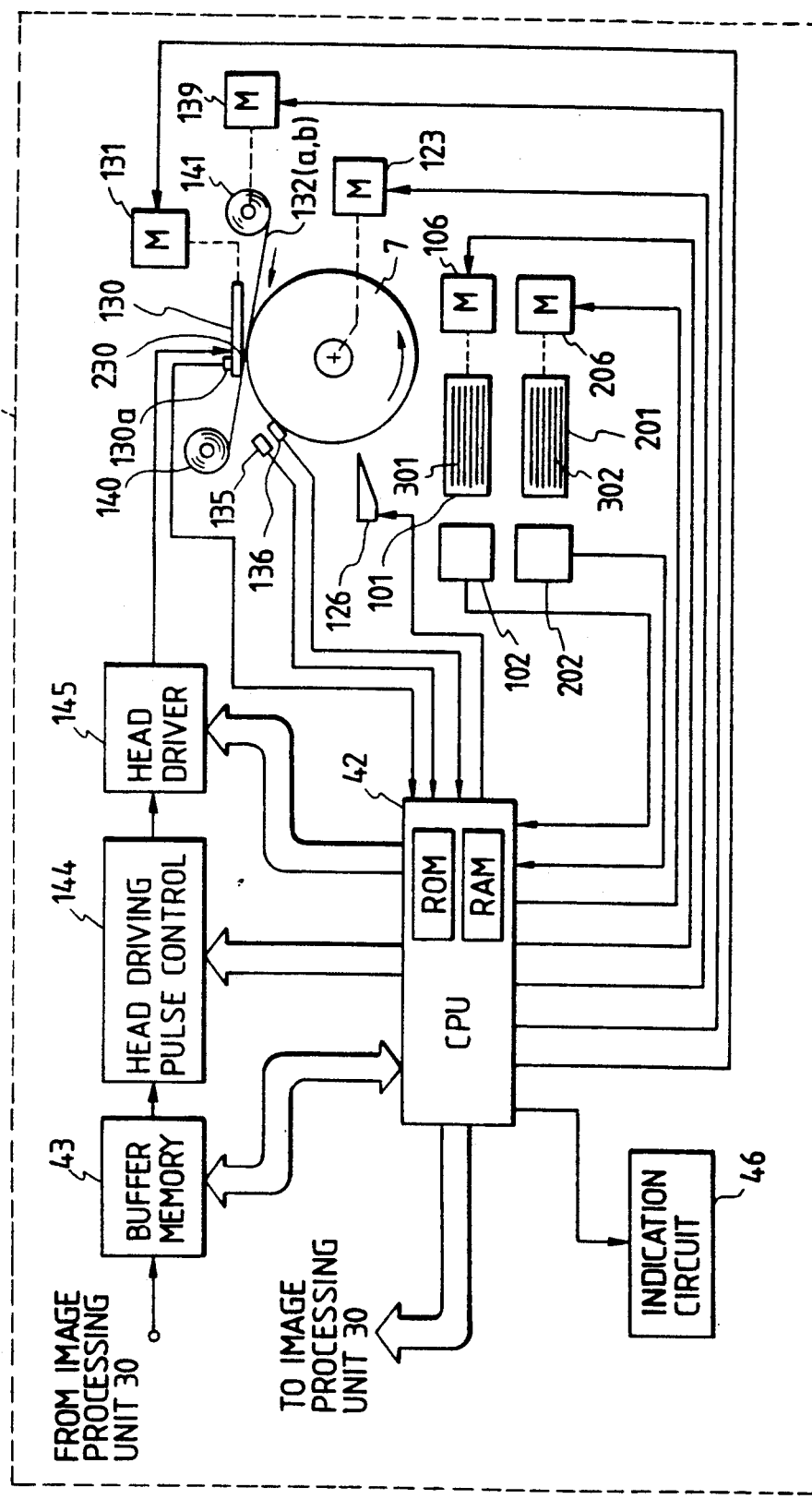

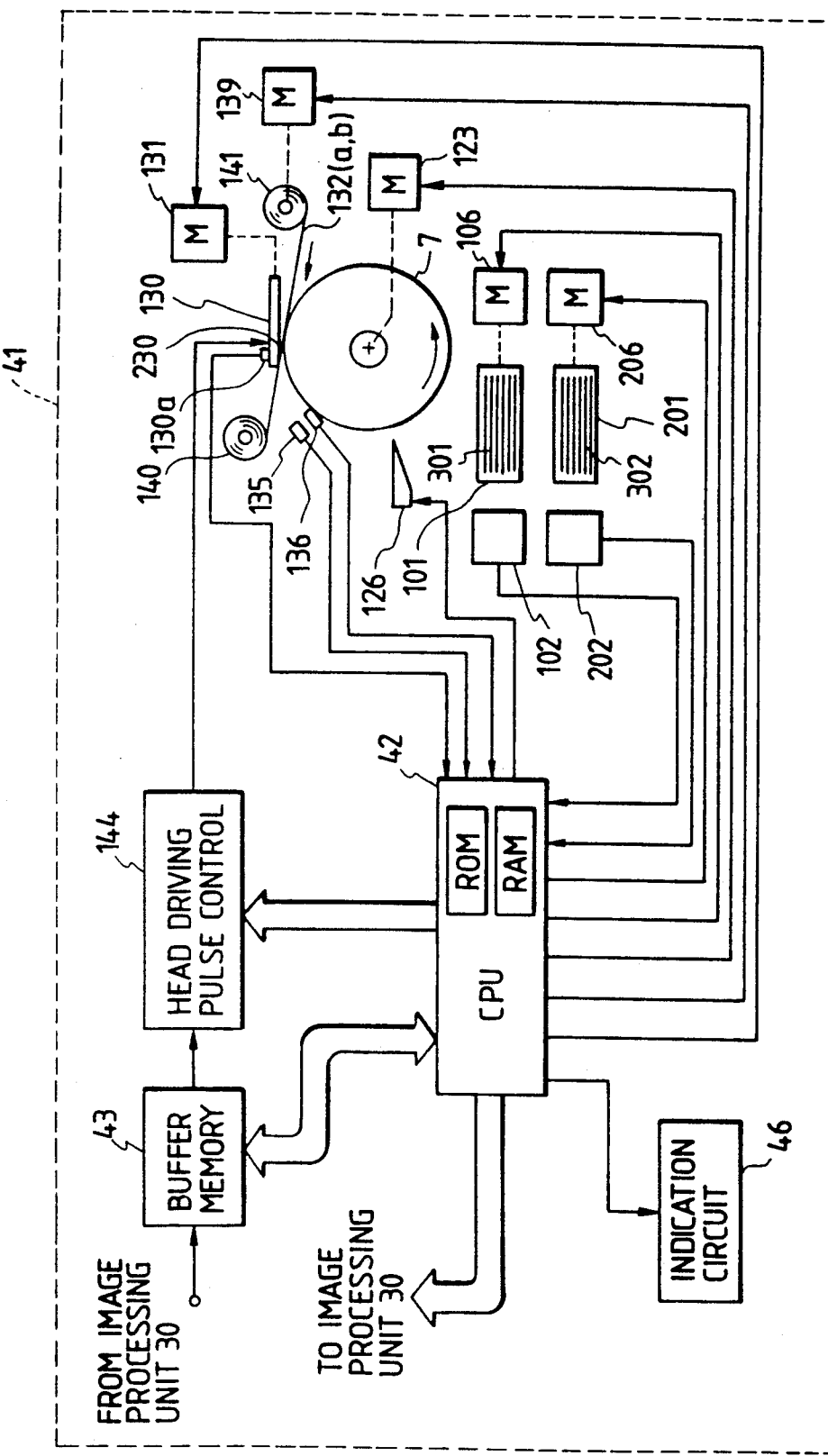

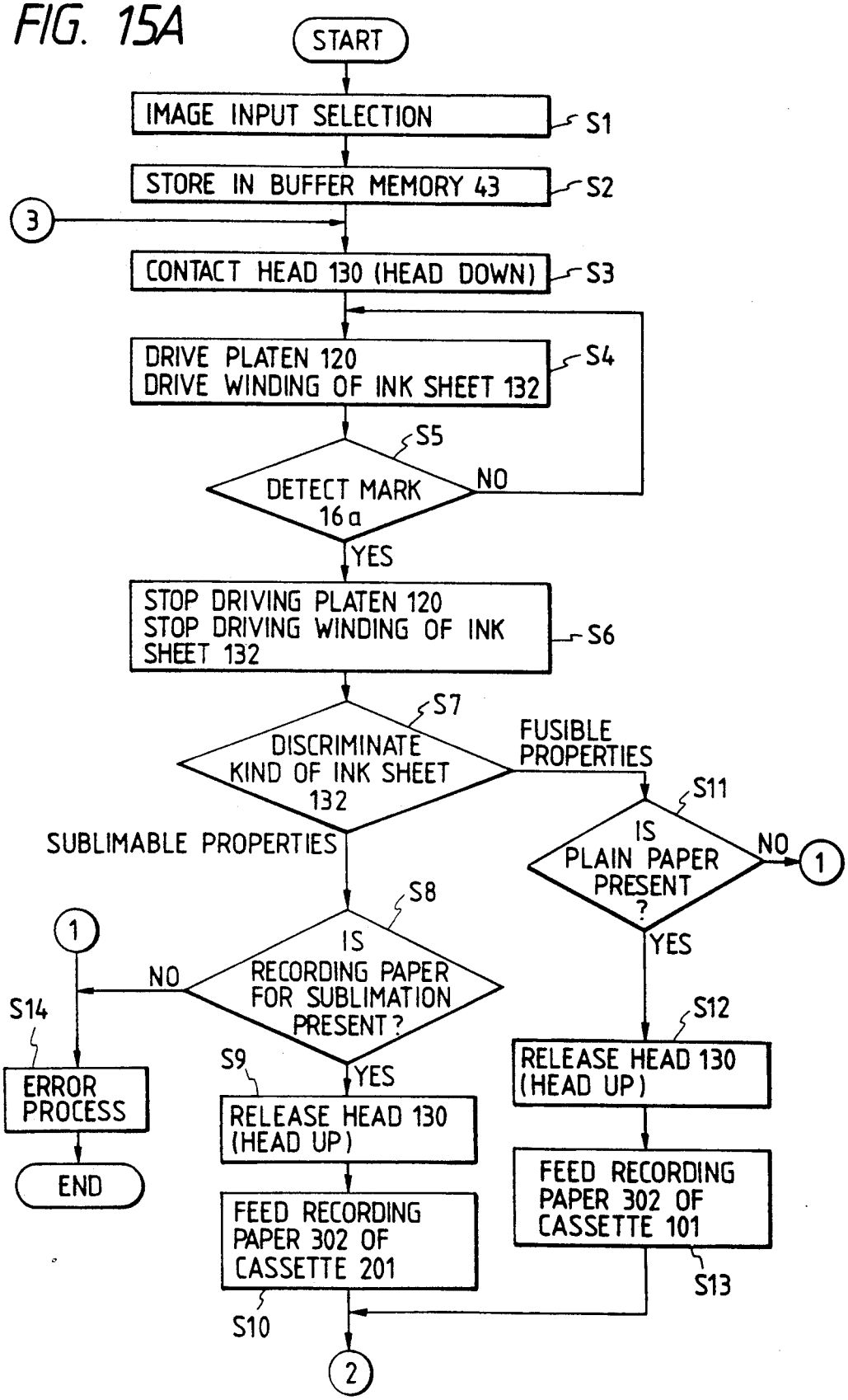

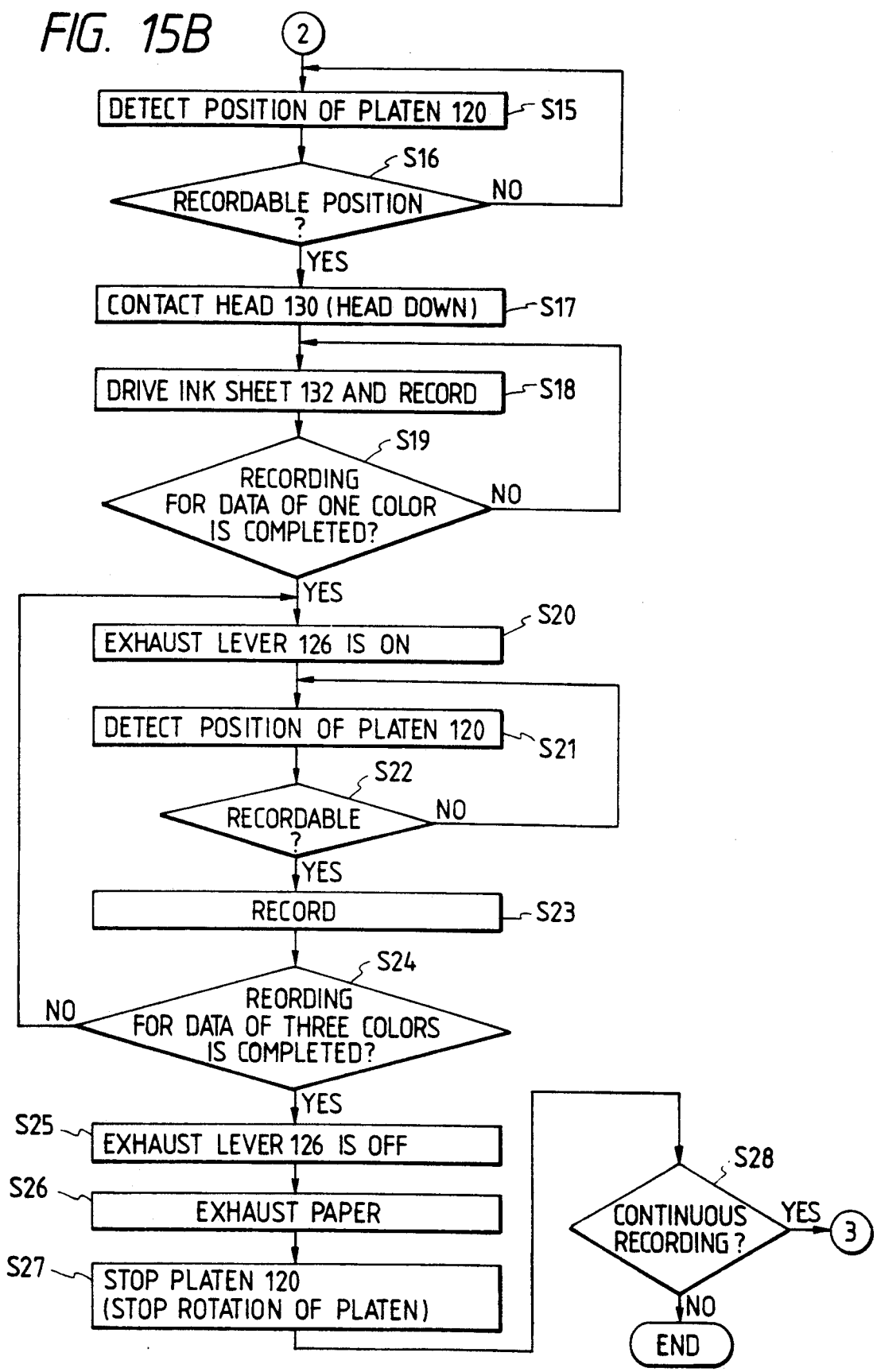

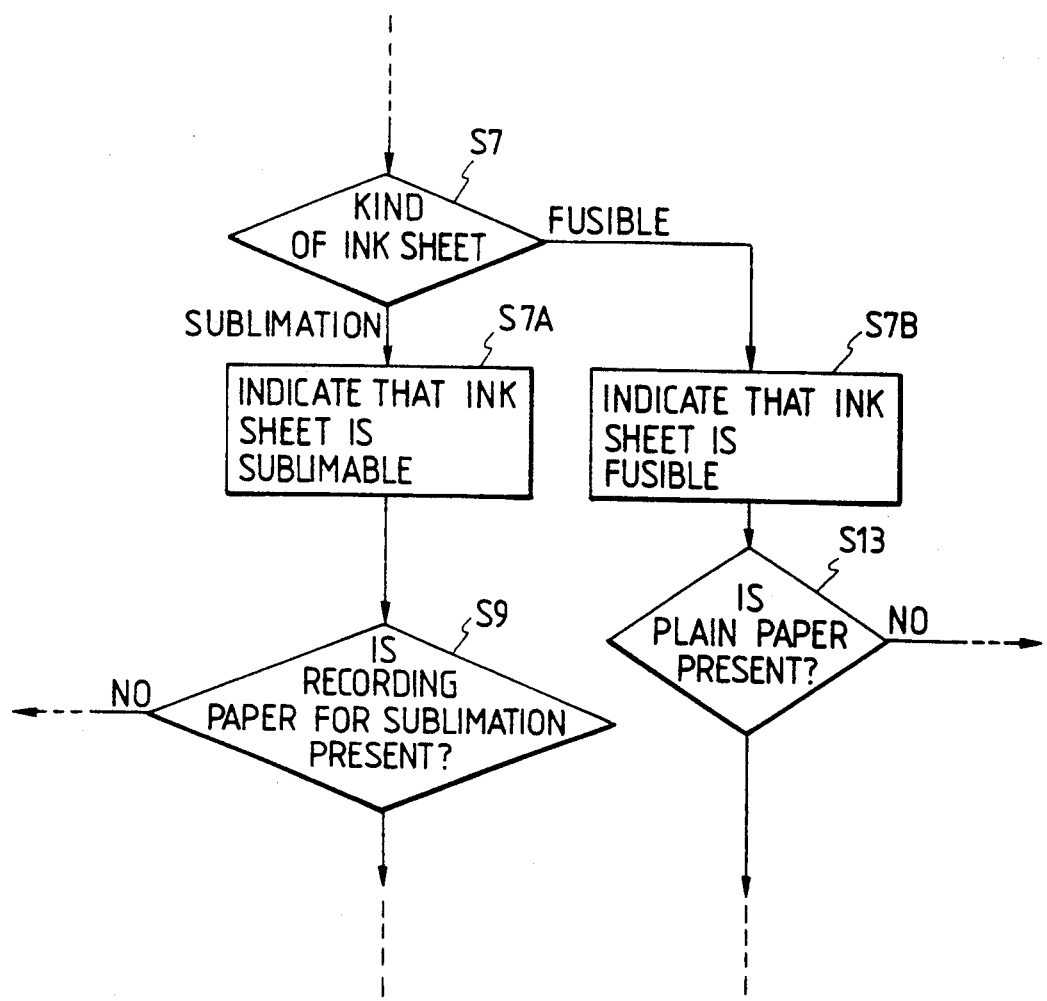

THERMAL TRANSFER RECORDING APPARATUS SWITCHABLE BETWEEN SUBLIMABLE AND FUSIBLE INK SHEETS

This application is a continuation-in-part of U.S. patent application Ser. No. 07/380,446 filed Jul. 17, 1989, now abandoned.

BACKGROUND OF THE INVENTION

1. Field of the Invention

The present invention relates to a recording apparatus for performing recording on a recording medium.

The recording apparatuses to which the present invention is applied includes a printer, a copying machine, an electronic typewriter, a facsimile apparatus, and the like.

2. Related Background Art

A color printer will be described below as an example of the recording apparatus.

In recent years, color printers for printing displayed color images such as color computer graphic or color video images have been increasingly developed. An available example of a color printer based on a thermal transfer method using a thermal head is a printer in which a thermal head transfers an image onto recording paper by using an ink sheet on which color materials of yellow (Y), magenta (M), cyan (C), and black (Bk) are coated, thereby obtaining a multi-color, multi-harmonization color image.

Typical examples of the ink sheet for use in color recording are a sublimable ink sheet on which a sublimable ink is coated and a fusible ink sheet on which a fusible ink is coated. In general, the sublimable ink sheet is suited to harmonization recording but requires expensive special recording paper having an ink receiving layer. The fusible ink sheet enables recording on inexpensive plain paper but is not suited to harmonization recording.

Conventionally, thermal transfer recording using the sublimable ink sheet or fusible ink sheet is realized by an exclusive thermal transfer printer. For this reason, in order to change an ink sheet to be used in accordance with the kind of data to be printed or printing cost, at least two printers must be prepared. This is an economic burden on the user. Therefore, a demand exists for a thermal transfer printer capable of selectively mounting the two kinds of ink sheets to perform recording.

In order to realize such a thermal transfer printer, the above problem in which reproducibility of harmonization varies in accordance with the kinds of ink sheet must be solved. That is, for example, if a thermal head is driven as in the case of the sublimable ink sheet in order to perform harmonization recording using the fusible ink sheet having low harmonization reproducibility, recording is performed by different harmonization levels due to a difference between properties of the two ink sheets.

SUMMARY OF THE INVENTION

It is an object of the present invention to provide a recording apparatus which can perform clear recording.

It is another object of the present invention to provide a recording apparatus which can perform clear harmonization recording.

It is still another object of the present invention to provide a recording apparatus which can perform recording in which properties of either a sublimable ink sheet having a sublimable ink or a fusible ink sheet having fusible ink can be realized.

It is still another object of the present invention to provide a recording apparatus which can perform recording with good harmonization properties for both fusible and sublimable ink sheets by changing a method of converting data to be recorded in accordance with the kind of ink sheet.

It is still another object of the present invention to provide a recording apparatus in which either a sublimable or fusible ink sheet can be mounted to perform printing and the kind of ink sheet can be easily confirmed by indicating whether the mounted ink sheet is the sublimable or fusible ink sheet.

It is still another object of the present invention to provide a recording apparatus in which either a sublimable or fusible ink sheet can be mounted to perform printing and printing can be performed on recording paper corresponding to the kind of mounted ink sheet.

It is still another object of the present invention to provide a recording apparatus in which either a fusible or sublimable ink sheet can be mounted to perform printing and in which pieces of thermal head drive information for fusible and sublimable ink sheets are stored, respectively, whether a mounted ink sheet is the sublimable or fusible ink sheet is discriminated, and head drive information corresponding to the discrimination result is read out to drive a thermal head, thereby performing harmonization recording corresponding to the ink sheet.

It is still another object of the present invention to provide a thermal recording apparatus which can change a method of driving a thermal head in accordance with whether an ink sheet to be used is a fusible or sublimable ink sheet and can change a feeding speed of recording paper in accordance with the driving method, thereby reducing a recording time in accordance with the ink sheet to be used.

BRIEF DESCRIPTION OF THE DRAWINGS

FIGS. 1A and 1B are block diagrams showing arrangements of an image processing unit and a printer unit of a color printer according to an embodiment of the present invention, respectively;

FIG. 2A is a block diagram showing a schematic arrangement of a head driving pulse control circuit;

FIG. 2B is a view showing an arrangement of a picture element data conversion table;

FIG. 2E is a flow chart for explaining a conversion data formation process of a conversion memory;

FIG. 12 is a block diagram showing an arrangement according to another embodiment of the printer unit of the color printer shown in FIG. 1C;

FIG. 14 is a block diagram showing an arrangement according to still another embodiment of the printer unit of the color printer shown in FIG. 1C;

FIGS. 15A and 15B are flow charts for explaining color recording of the embodiment shown in FIG. 12; and FIG. 16 is a flow chart for explaining color recording of the embodiment shown in FIG. 12.

DETAILED DESCRIPTION OF THE PREFERRED EMBODIMENTS

In an embodiment to be described below, if it is discriminated that a fusible ink sheet is mounted, input data of one picture element is divided into a plurality of dots, and a harmonization level of each dot is determined in accordance with a harmonization level of the input picture element. A thermal head is heated such that each recording element of the thermal head is heated in accordance with a determined harmonization level of a corresponding dot. If it is discriminated that a sublimable ink sheet is mounted, a plurality of dots are assigned to input one-picture-element data. Harmonization levels of a plurality of dots are determined in accordance with a harmonization level of the picture element data, and recording is performed such that the picture element data corresponds to a plurality of dots.

Upon recording on a fusible ink sheet, each dot of a dot matrix has harmonization levels of $1/n^2$ with respect to that of a sublimable ink sheet.

A preferred embodiment of the present invention will be described below with reference to the accompanying drawings.

[Explanation of Color Printer (FIGS. 1A to 1C & FIGS. 2A to 2G]

Figure 1B:
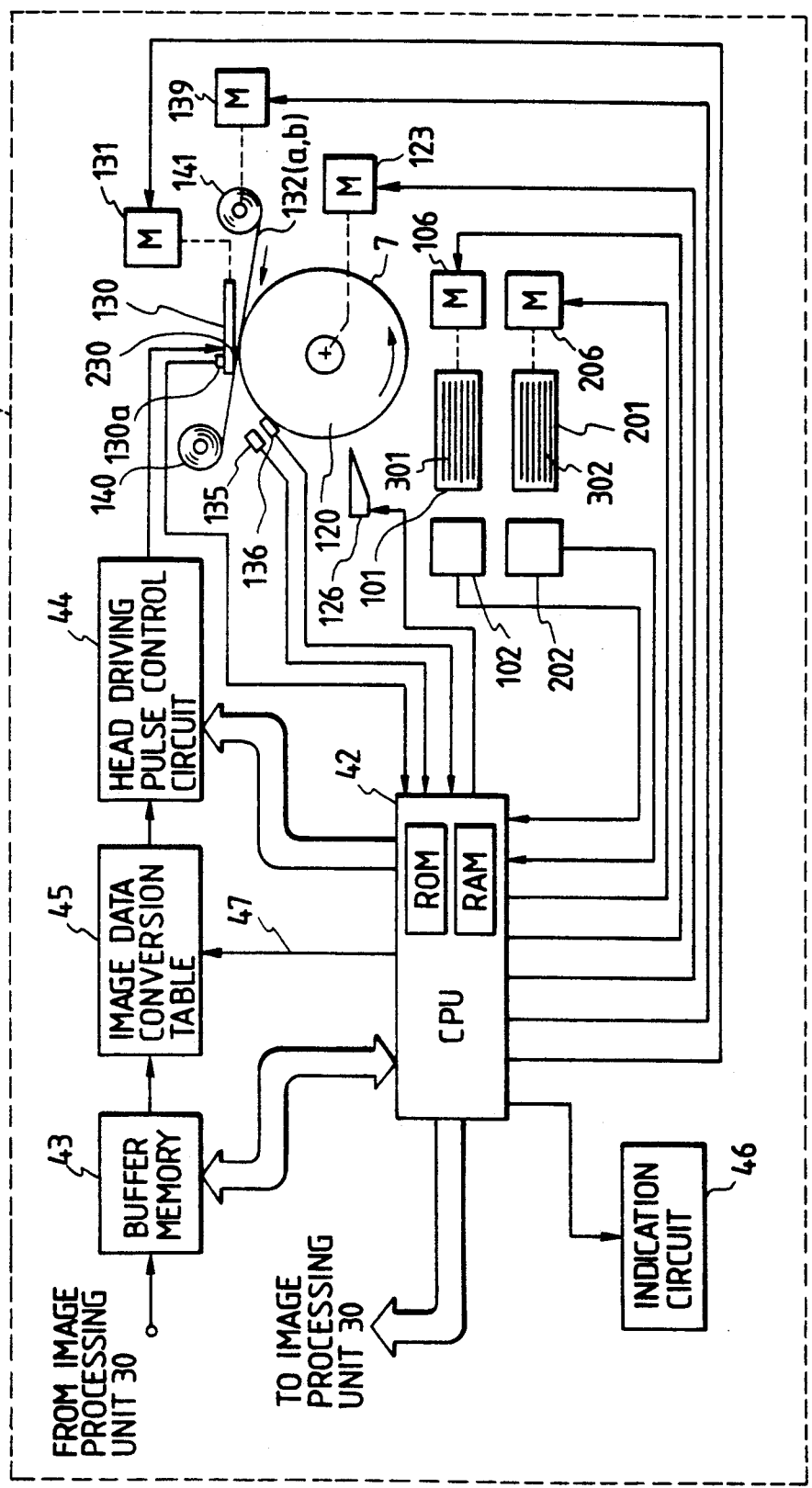
Figure 1C:
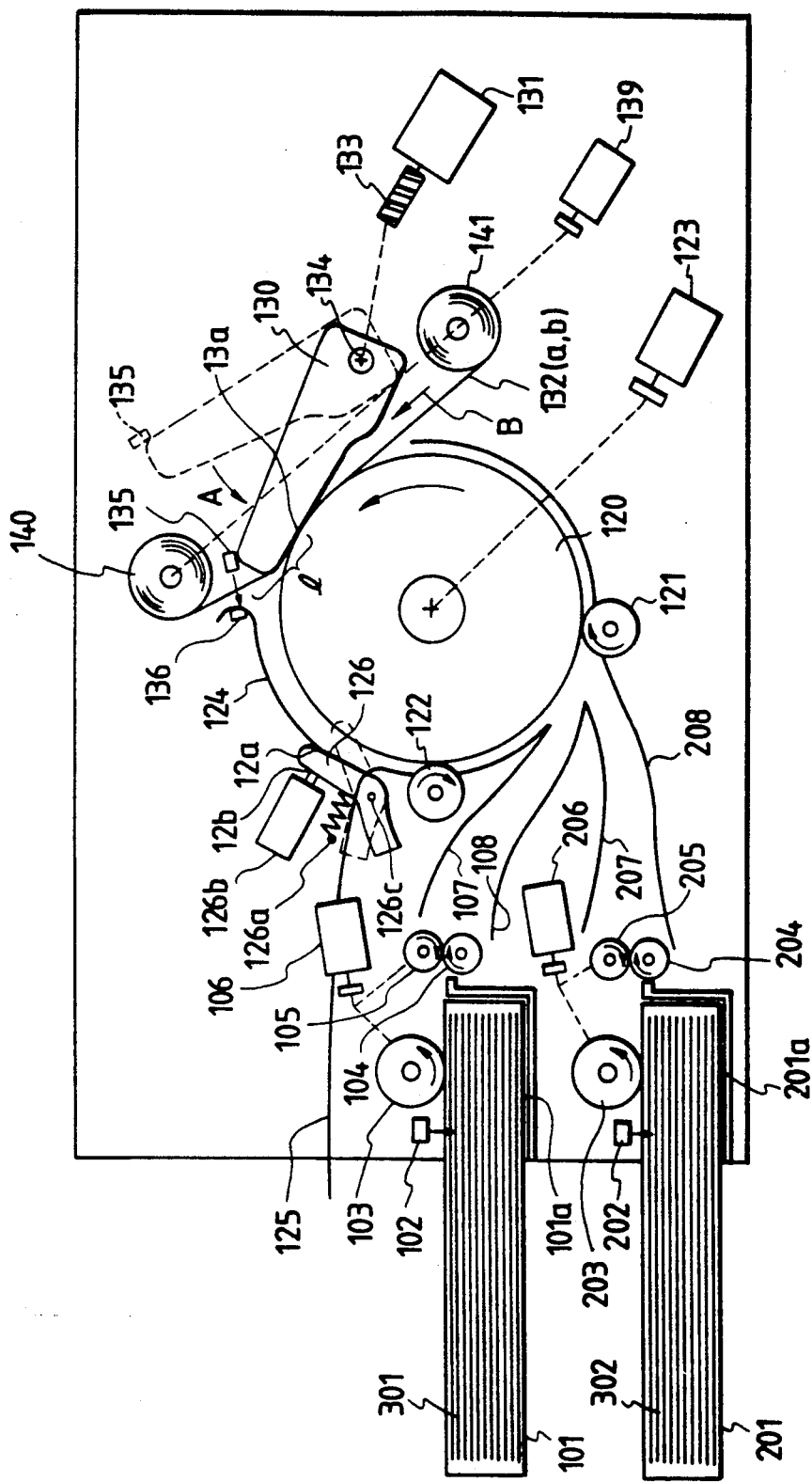
FIG. 1C is a side sectional view showing a mechanical portion of the printer unit of the color printer.

FIGS. 1A and 1B are block diagrams showing circuit arrangements of a thermal transfer color printer according to an embodiment of the present invention FIG. 1A shows an input image processing unit and FIG. 1B shows a printer unit including a mechanism shown in FIG. 1C.

In an image processing unit 30, a color image input from, e.g., a telephone line input terminal 31 is supplied to a color demodulator 34. The input color image is demodulated into an NTSC signal or color-difference signals by the demodulator 34 and separated into R, G, and B signals if a switch 32 is connected to a (b) side. The image processing unit 30 has a video input terminal 36 in addition to the telephone line input terminal 31. Therefore, a video signal input to the video input terminal 36 is supplied to the decoder 35 by switching the switch 32 to an (a) side. Each of the RGB signals obtained by separating the color image signal by the decoder 35 is converted into multivalue data of six bits (64 harmonization levels) per picture element and stored in an RGB memory 38.

A color conversion circuit 40 receives and converts the R, G, and B signal data into C (cyan), M (magenta), and Y (yellow) signals, respectively. The color image data signal converted into the YMC signal data by the color conversion circuit 40 is supplied to a printer unit 41 shown in FIG. 1B. Note that the above circuit blocks and the switch 32 are controlled by a CPU 42 shown in FIG. 1B. The CPU 42 comprises a ROM for storing process procedures to be described later with reference to flow charts shown in FIGS. 11A to 11C and a RAM to be used as a work area in control operations.

Figure 7:
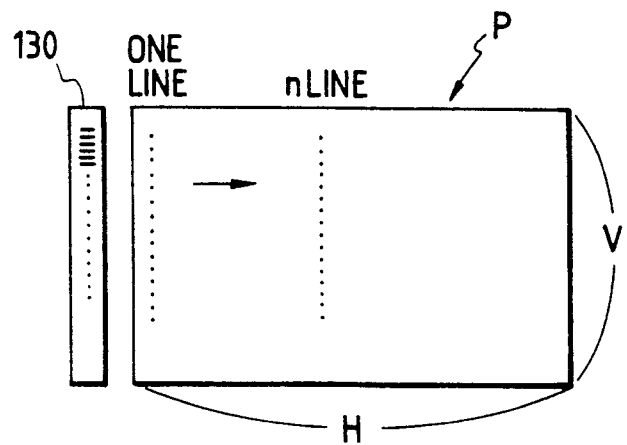
FIG. 7 is a view showing the contents in a buffer memory shown in FIG. 1B.

In the printer unit 41, the image data output from the image processing unit 30 is sequentially stored in a buffer memory 43 in units of lines of an image to be recorded as shown in FIG. 7, temporarily held in the buffer memory 43, and then output to a picture element data conversion table 45 shown in detail in FIG. 2B (to be described later) in synchronism with a recording speed under the control of the CPU 42. Picture element data conversion corresponding to the kind of mounted ink sheet is executed, and the converted image data is output to a head driving pulse control circuit 44. Note that an arrangement of the head driving pulse control circuit 44 is shown in detail in FIG. 2A and will be described in detail later. The CPU 42 discriminates the kind of ink sheet 132 (a;b) and indicates the discrimination result, the presence/absence of recording paper P, various error information, and the like on an indication unit 46.

An arrangement of the printer 41 will be described below.

Since a mechanical portion of the printer unit 41 shown in FIG. 1B is shown in detail in a side view of FIG. 1C, a description will be made with reference to FIG. 1C. Note that the same reference numerals as in FIG. 1B denote the same parts in FIG. 1C.

Referring to FIG. 1C, a plain paper cassette 101 stores plain paper, while a sublimable ink recording paper cassette 201 stores sublimable ink recording paper. As shown in FIG. 1C, the printer can simultaneously detachably mount the two cassettes 101 and 201 in mounting portions 101a and 201a, respectively. The cassette 101 stores plain paper 301 for use in thermal transfer using a fusible ink sheet 132a, and the cassette 201 stores sublimable thermal transfer recording paper 302 having an ink receiving layer for ink from a sublimable ink sheet 132b on which a sublimable ink is coated.

Figure 4A:
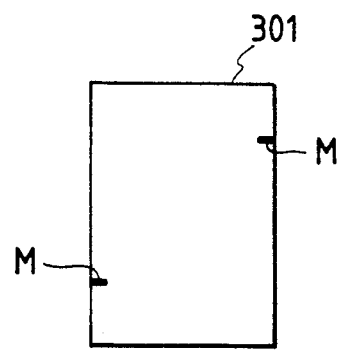
FIGS. 4A and 4B are plan views for explaining marking of recording paper in the embodiment.
Figure 4B:
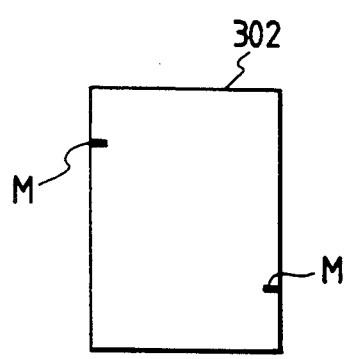

If sheets of two kinds of recording paper have the same size, a sheet of one kind of recording paper may be erroneously stored in a cassette for a sheet of the other kind of recording paper. Therefore, in the printer of this embodiment, the plain paper 301 and the sublimable thermal transfer recording paper 302 have marks M as shown in FIGS. 4A and 4B on their lower surfaces, respectively. When a cassette is mounted, a reflecting photosensor 102 or 202 located to oppose the marks detects the plain paper 301 or the sublimable thermal transfer recording paper 302. Therefore, even if the sublimable thermal transfer recording paper 302 is erroneously stored in the cassette 101; the plain paper 301 is erroneously stored in the cassette 201; a sheet of paper is stored to face downward in a cassette; or plain paper without marking is stored, the photosensor 102 or 202 does not detect the recording paper and causes the indication unit 46 (FIG. 1B) to indicate a suitable error message assuming that no paper is present.

Sheets of recording paper stored in the cassette 101 or 201 are fed to the printer main body one after another by a pickup roller 103 or 203 and separating rollers 104 and 105 or 204 and 205, respectively. Driving sources of these rollers are motors 106 and 206. By selectively driving these motors, the plain paper 301 or the sublimable thermal transfer recording paper 302 is fed in the printer main body.

The plain paper 301 or the sublimable thermal transfer recording paper 302 fed by the above paper feeding mechanism is guided by paper guides 107 and 108 or 207 and 208, respectively, to a platen roller 120. Pinch rollers 121 and 122 are biased toward the platen roller 120 by springs (not shown) and convey the recording paper such that the recording paper is sandwiched between the platen roller 120 and the pinch rollers 121 and 122. A motor 123 is a stepping motor and drives the platen roller 120 via reduction gears (not shown). A paper guide 124 guides the paper toward an exhaust tray for receiving exhausted recorded paper.

A paper guide lever 126 is biased by a spring 126a and a plunger 126b. Upon ON of the plunger 126b, the lever 126 is pivoted about a shaft 126c by an attracting force of the plunger 126b to a position (separated from the platen roller 120) indicated by a solid line in FIG. 1C. Upon OFF of the plunger 126b, the level 126 is pivoted by a biasing force of the spring 126a to a position (in contact with the platen roller 120) indicated by a broken line in FIG. 1C.

Figure 6:
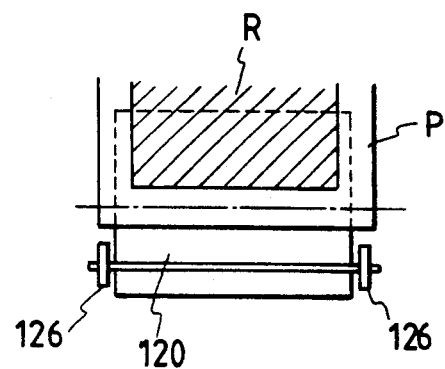
FIG. 6 a plan view showing an arrangement of a paper guide lever, a platen, and recording paper shown in FIG. 1C.

FIG. 6 shows a positional relationship between the platen roller 120, the paper guide lever 126, and the recording paper P, i.e., 301 or 302. As shown in FIG. 6, the length of the platen roller 120 in the longitudinal direction is set slightly smaller than the width of the recording paper 301 or 302 and sufficiently brings the platen roller 120 into contact with a head 130 throughout the entire area of a recording range R indicated as a hatched portion. The paper guide levers 126 are located at the both sides of the platen roller 120 and within the width of the recording paper 301 or 302 and guide conveyance of the recording paper 301 or 302.

Therefore, when the paper guide lever 126 is in the position indicated by the solid line in FIG. 1C, the recording paper P is guided by the side surface of the lower surface 12a of the paper guide lever 126 and conveyed again to the recording position corresponding to the head 130 via the pinch rollers 121 and 122. When the paper guide lever 126 is in the position indicated by the broken line in FIG. 1C, the recording paper 301 or 302 is guided by the side surface of the upper surface 12b of the paper guide lever 126, separated from the platen roller 120, and then exhausted to the exhaust tray 125.

A contact/separation mechanism of the head 130 with respect to the platen roller 120 will be described below. A head up/down motor 131 drives the head 130 such that the head 130 is urged against (down) via the ink sheet 132 and the recording paper P or separated from (up) the platen roller 120. That is, rotation of a worm gear 133 mounted on the shaft of the motor 131 is transmitted to gears 19 and 20 shown in FIG. 3 via reduction gears (not shown). The head 130 and a rotary plate 22 are integrally mounted on a head driving shaft 134 of the gear 20. Both ends of a torsion coil spring 23 are fixed to the rotary plate 22 and the gear 20.

Figure 3:
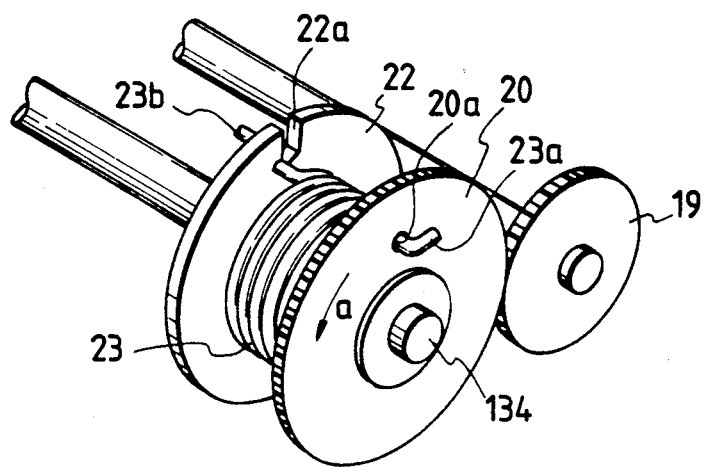
FIG. 3 is a perspective view showing an urging mechanism of a thermal head shown in FIG. 1C.

Therefore, when the motor 131 is driven to rotate the gear 20 counterclockwise as indicated by an arrow a in FIG. 3, a force in the same direction acts on the rotary plate 22 via the spring 23 to drive the head driving shaft 134 and the head 130 in a direction indicated by an arrow A in FIG. 1C, thereby bringing the head 130 into contact with the platen roller 120. When the motor 131 is driven to further rotate the gear 20 counterclockwise, the spring 23 is charged, and the head 130 is urged against the platen roller 120 by the charging force. At this time, a rotational phase of the gear 20 is detected by a detection mechanism (not shown) to detect a charging amount of the spring 23, thereby controlling the urging force acting on the head 130 against the platen roller 120 by at least two steps. Note that the urging force on the head 130 against the platen roller 120 is controlled by pulse count control performed by the CPU when the motor 131 is a pulse motor and is controlled by a detection mechanism such as a switch when the motor 131 is a DC motor. In this case, the two-step urging force includes an urging force (e.g., about 4 kg to 6 kg, and preferably, about 5 kg) when plain paper is used and an optimal urging force (e.g., about 2 kg to 4 kg, and preferably, about 3 kg) when sublimable thermal transfer recording paper is used. When the motor 131 is driven in an opposite direction (clockwise), the gear 20 is driven in a direction opposite to the arrow shown in FIG. 3. Therefore, the head 130 is pivoted about the shaft 134 in a direction opposite to the direction of arrow A in FIG. 1C to the position indicated by the broken line and removed from the platen roller 120.

In order to uniformly distribute the urging force acting on the head 130 against the platen roller 120 along the longitudinal direction of the platen roller 120, the head urging mechanism comprising the gears 19 and 20, the rotary plate 22, and the torsion coil spring 23 shown in FIG. 3 is mounted on each of two base plates (not shown) for supporting both the side portions of the platen roller 120. (Note that an end portion 23a of the torsion coil spring 23 is locked by an opening 20a formed in the gear 20 and its other end 23b is locked by a notch 22a formed in the rotary plate 22). In addition, the worm gear 133 is mounted on the shaft of the motor 131. Therefore, even when energization of the motor 131 is interrupted after the spring 23 is charged to urge the head 130 against the platen roller 120, the shaft of the motor 131 is reversely rotated by the charging force of the spring 23 to keep urging the head 130 against the platen roller 120.

[Explanation of Ink Sheet and Driving System thereof (FIG. 5)]

Figure 5:
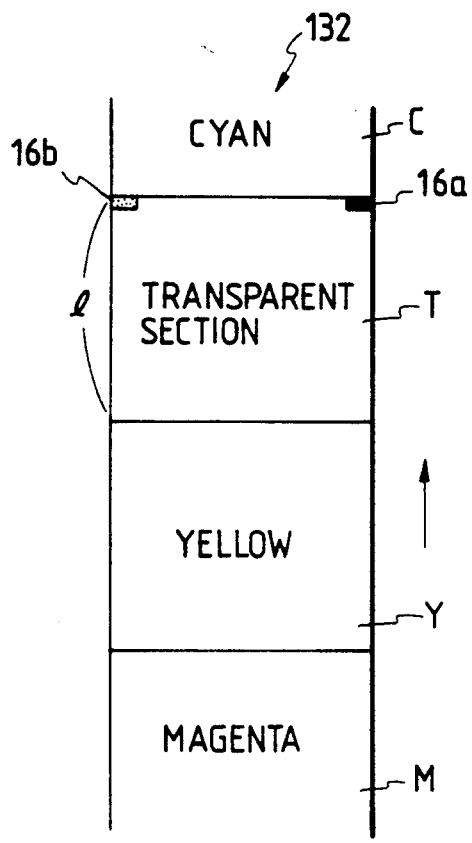
FIG. 5 is a plan view for explaining an ink sheet in the embodiment.

An arrangement of the ink sheet 132 and its driving system will be described below. As shown in FIG. 5, on the ink sheet 132, a transparent portion T having a mark 16a for detecting a sheet position and portions on which dyes of yellow Y, magenta M, and cyan C for performing color recording are coated are successively formed in the order named. The transparent portion T is a portion for synchronizing the colors to be printed. When the portion T is detected, it is detected that the yellow Y portion comes next.

On the sublimable ink sheet 132b, sublimable dyes are coated on Y, M, and C portions. When the sublimable ink sheet 132b is to be used, color recording is performed by using sublimable thermal transfer paper in the cassette 201. On the fusible ink sheet 132a, a fusible ink is coated on Y, M, and C portions. When the fusible ink sheet 132a is to be used, color recording is performed by using the plain paper 301 stored in the cassette 101. A mark 16b is not added to the fusible ink sheet 132a but only to the sublimable ink sheet 132b. Therefore, the sublimable ink sheet 132b has both the positioning mark 16a and the identification mark 16b, while the fusible ink sheet 132a has only the positioning mark 16a.

The fusible ink sheet is obtained by coating a solid ink fusible with heat on a base consisting of, e.g., polyester, polyimide, nylon, or cellophane and having high heat-resistance and thermal conductivity. The solid ink is formed of a binder, a colorant, and a softener. Examples of the binder, the colorant, and the softener are: carnauba wax and ester wax; a dye and a pigment; and a lubricant, respectively. A melting point of the fusible ink sheet is e.g., about 60° C. to 80° C.

The sublimable ink sheet is obtained by forming a dye-containing layer consisting of a heat sublimable dye sublimable with heat and a dispersant or binding agent such as methylcellulose, if necessary, on the base described above. Examples of the heat sublimable dye are a disperse monoazo type dye and a disperse anthraquinone type dye.

The mark representing the kind of ink sheet may be printed in black color or made by adhering a silver-color piece. In addition, the position of the mark is not limited. For example, in the case of a monocolor ink sheet, a line representing the kind of ink sheet may be formed on the end portion not used upon recording along the longitudinal direction of the ink sheet such that it is formed at the right side of FIG. 5 for the sublimable ink sheet 132b and at the left side thereof for the fusible ink sheet 132a. By reading a position of the line by a photosensor, the printer may discriminate the kind of ink sheet.

Referring to FIG. 1C, a stepping motor 139 is a driving source of the feeding mechanism for the ink sheet 132a or 132b. That is, rotation of the motor 139 is transmitted to a drive shaft 140 to wind the ink sheet 132 in a direction indicated by an arrow B. In this case, suitable friction is applied to a rotating shaft 141 of the roll ink sheet 132. Therefore, when the ink sheet 132 is to be wound by the winding shaft 140, since the shaft serves as a load on the winding shaft 140, the ink sheet 132 is not loosened. In addition, even when the platen roller 120 is rotated with the head 130 urged against the platen roller 120, an urging force acting on the head 130 against the platen roller 120 can be adjusted so that the ink sheet 132 is not loosened by a frictional force or static electricity between the recording paper 301 or 302 and the ink sheet 132a or 132b.

[Mark Detection of Ink Sheet (FIG. 1C & FIG. 5)]

Referring to FIG. 1C, photodiodes 135 and phototransistors 136 constitute two photosensors (135-1 and 136-1, and 135-2 and 136-2). Each photodiode 135 is mounted on the upper portion of the thermal head 130 and paired with the corresponding phototransistor 136 to constitute one photosensor. These photosensors are for detecting the marks 16a and 16b formed on the ink sheet 132, respectively. That is, the photosensor (135-1 and 136-1) for detecting the mark 16a and the photosensor (135-2 and 136-2) for detecting the mark 16b are arranged in the widthwise direction of the recording paper.

When the thermal head 130 is down and one photosensor detects the mark 16a, the ink sheet 132 is set at a recording start initial position At this time, if the other photosensor detects the mark 16b, the mounted ink sheet 132 is discriminated to be the sublimable ink sheet 132b. If the mark 16b is not detected, the fusible ink sheet 132a is discriminated.

As shown in FIG. 5, a transparent portion having a length "1" from the position of the photosensor 135;136 to the recording position 13a (FIG. 1C) of the head 130 is formed on the downstream side of the mark 16b of the ink sheet 132 Therefore, when the mark 16a is detected by the photosensor (135;136), the leading edge of the ink sheet Y opposes the head 130. In this manner, the initial position of the ink sheet for starting recording is set.

A reduction ratio of the reduction system comprising the stepping motors 123 and 139 is set such that the ink sheet 132 is fed faster than the recording paper P at the recording position 13a of the head 130 when the motors 123 and 139 are similarly driven However, since a slip mechanism (not shown) is provided to the winding shaft 140, the ink sheet is wound in the same amount as a feed amount of the recording paper at the head and the platen roller while a difference between the feed amounts is absorbed by the slip mechanism.

[Explanation of Head Driving Pulse Control Circuit (FIGS. 2A to 2G & FIGS. 8 to 10)]

The head driving pulse control circuit 44 has an arrangement as shown in FIG. 2A.

Figure 8:
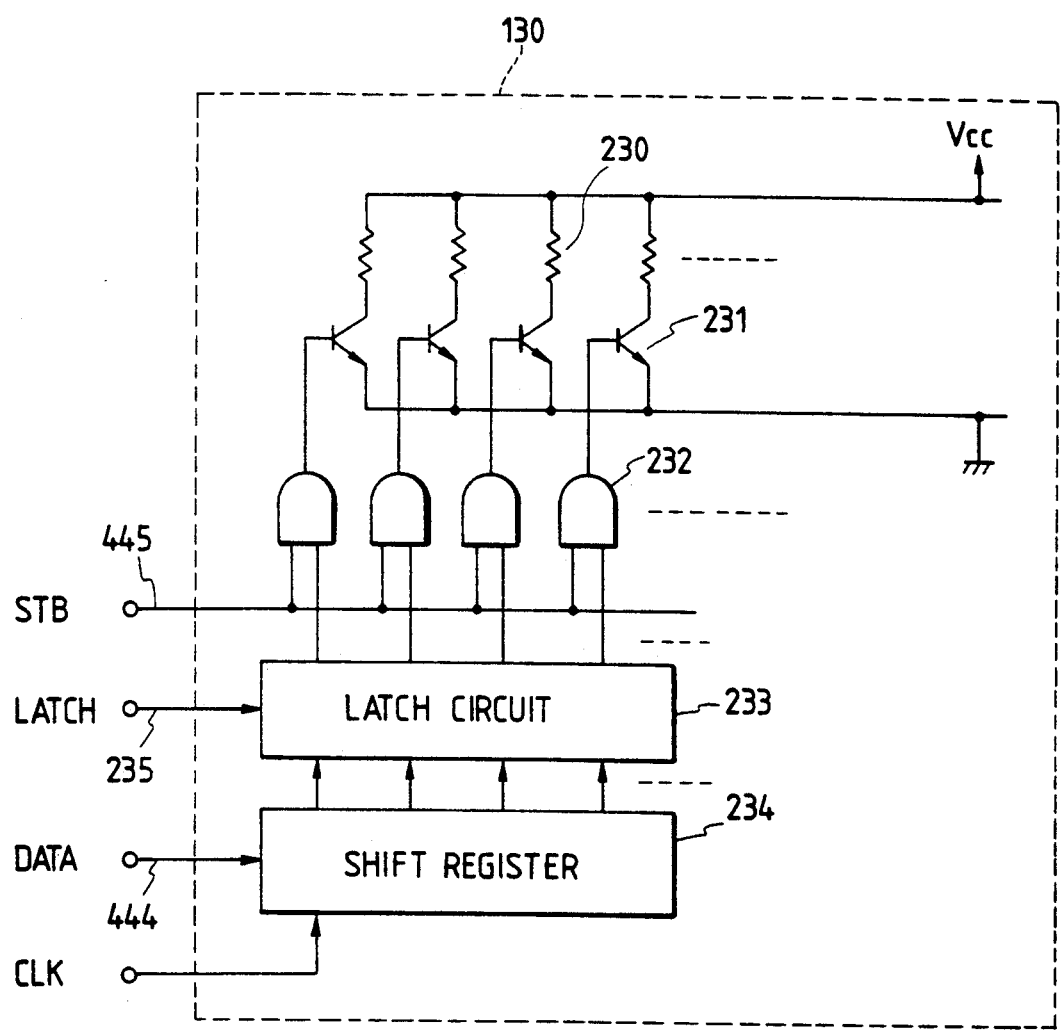
FIG. 8 is a block diagram showing in detail the thermal head of the embodiment.

FIG. 8 shows an arrangement of the thermal head 130.

Referring to FIG. 8, heating resistive elements 230 are arranged in a line in the widthwise direction of the recording paper with element intervals of 12 picture elements (12 heating elements/mm) therebetween. A latch circuit 233 latches one-line data to be recorded. Serial data 444 supplied to a shift register 234 is sequentially shifted in by a clock pulse CLK, latched by the latch circuit 233 in accordance with a latch signal 235, and converted into parallel data. In this manner, data to be recorded corresponding to the heating resistive elements 230 is held in the latch circuit 233. A timing and a time period for applying a voltage are determined by a strobe signal STB 445, and an output transistor 231 corresponding to an element having data is turned on. In this manner, the corresponding heating resistive element 230 is energized and heated.

Referring to FIG. 2A, a signal generator 450 outputs a clock CLK of a predetermined frequency, and frequency divider circuit 451 outputs a latch signal 235 each time it counts pulses of the clock signal CLK corresponding to the number of heating elements of one line. In accordance with each picture element of input picture element data, a harmonization conversion decoder 440 transfers harmonization data 444 to each register stage of the shift register 234 in synchronism with the signal CLK. In order to process a color image, the harmonization conversion decoder 440 performs harmonization conversion for each of colors Y, M, and C.

A harmonization counter 441 counts up each time the latch signal 235 is supplied. On the basis of a command signal 61 from the CPU 42, the harmonization counter 441 performs counting of mod 64 (six bits) for the sublimable ink sheet 132b and counting of mod 16 (four bits) for the fusible ink sheet 132a. The harmonization conversion decoder 440 compares the count of the harmonization counter 441 with the input picture element data. The harmonization conversion decoder 440 outputs, as the harmonization data 444, "1" when the picture element data is larger than or equal to the count and "0" when the picture element data is smaller than the count.

A strobe signal generating circuit 442 outputs a strobe signal STB 445 slightly delayed from the latch signal, thereby driving the heating elements 230 to perform driving. A harmonization ROM table 443 stores data for adjusting the pulse width of the STB signal for a sublimable ink sheet, and a harmonization ROM 447 for a fusible ink sheet stores data for adjusting the pulse width of the STB signal for a fusible ink sheet. Each ROM receives a temperature correction signal 446 from a heat temperature detector 130a and stores correction data for obtaining optimal harmonization characteristics for each color on the basis of the temperature correction signal 446. A switch 448 is changed over by the CPU 42 in accordance with the kind of mounted ink sheet 132 and outputs harmonization correction data corresponding to the kind of ink sheet 132 to the strobe signal generating circuit 442.

[Explanation of Picture Element Data Conversion (FIGS. 2B to 2F)]

FIG. 2B is a block diagram showing an arrangement of the picture element data conversion table for converting, in accordance with the kind of mounted ink sheet, each picture element of image data read out from the buffer memory 43.

Referring to FIG. 2B, a switch 51 is changed over in accordance with a color (YMC) of the readout image data, and a conversion memory 52 stores conversion data to be described later. The conversion memory 52 receives the image data from the buffer memory 43 as an address and outputs, in accordance with a control signal 47 from the CPU 42, 4-bit data when the fusible ink sheet 132a is mounted and 6-bit data when the sublimable ink sheet 132b is mounted. The control signal 47 includes a designation signal 53 for designating the kind of ink sheet 132 and an x-y address signal 54 of a 2×2 matrix output when the mounted ink sheet is a fusible ink sheet.

A data format of the conversion memory 52 will be described below.

Figure 2C:
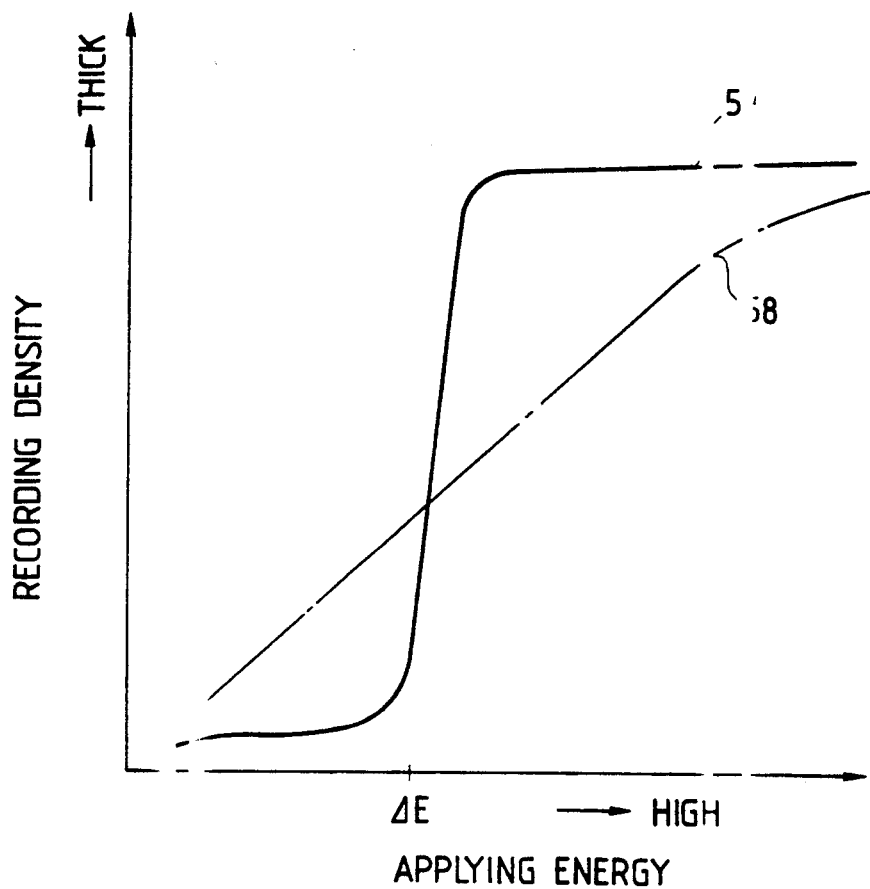
FIG. 2C is a graph showing recording density curves of fusible and sublimable ink sheets as a function of applying energy.

FIG. 2C is a graph showing a relationship between an applying energy to the thermal head 130 and recording density in accordance with the kind of ink sheet. Referring to FIG. 2C, a curve 58 indicates a relationship between the applying energy and the recording density obtained when the sublimable ink sheet 132b is used, and a curve 59 indicates a relationship between the applying energy and the recording density obtained when the fusible ink sheet 32a is used. As shown in FIG. 2C, in the case of the sublimable ink sheet 132b, the recording density substantially in proportional to the applied energy is obtained. However, in the case of the fusible ink sheet 132a, since the density value is rapidly increased near $\Delta E$, it is difficult to perform multi-harmonization-level recording which can be performed by the sublimable ink sheet 132b.

Assuming that currently input image data has 64 harmonization levels (six bits), the data with 64 harmonization levels (six bits) is directly output for the sublimable ink sheet 132b. In the case of the fusible ink sheet 132a, however, the input one-picture-element data is divided into 2×2=4 dots, and each dot is expressed by 16 harmonization levels to obtain 64 (=4×16) harmonization levels. As a result, the harmonization levels are not apparently lowered even for the fusible ink sheet 132a. When the fusible ink sheet 132a is used, each input picture element is recorded by four dots. Therefore, in order to equalize the sizes of the recorded image data, the input picture element data is expressed by 2×2=4 dots for the sublimable ink sheet 132b. Note that the harmonization level of each dot to be recorded is equal to that of the input picture element data.

Figure 2D:
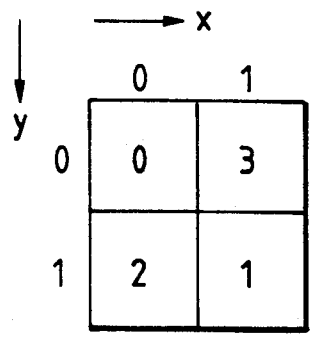
FIG. 2D is a view showing a picture element conversion matrix.

FIG. 2D shows a picture element conversion matrix used in this embodiment. X and y axes are determined as shown in FIG. 2D to set addresses.

FIG. 2E is a flow chart for explaining a process for forming fusible ink sheet table data of the conversion memory 52. This data formation process is shown for explaining the data format of the conversion memory 52 and therefore need not be executed by the color printer of this embodiment. That is, data having such characteristics need only be stored in the memory 52. Note that since the same data as the address (image data) of conversion data for a sublimable ink sheet is stored at each address, data read out from the buffer memory 43 is directly output to the head driving pulse control circuit 44.

Referring to FIG. 2E, picture element data D is set to be "0" in step S100, and y=0 and x=0 are set in steps S101 and S102, respectively. In step S103, $d_0$ is set as an integer part of (D/4) and $d_1$ is set as a remainder of (D/4). In step S104, a picture element designated by (x,y) of the matrix shown in FIG. 2D is compared with the value of $d_1$. If $d_1$ is larger than the picture element, the flow advances to step S105, and ($d_0+1$) is written in the picture element portion. If $d_1$ is not larger than the picture element, $d_0$ is written in the picture element portion. In this manner, data is written in a position corresponding to (0,0) of the matrix and then written in the respective picture element positions in an order of (1,0), (0,1), and (1,1). After data of four picture elements are written, the flow advances to step S111, and the picture element data D is incremented by one. The above process is repeatedly executed until the picture element data D exceeds the number of maximum harmonization levels (64).

Figure 2F:
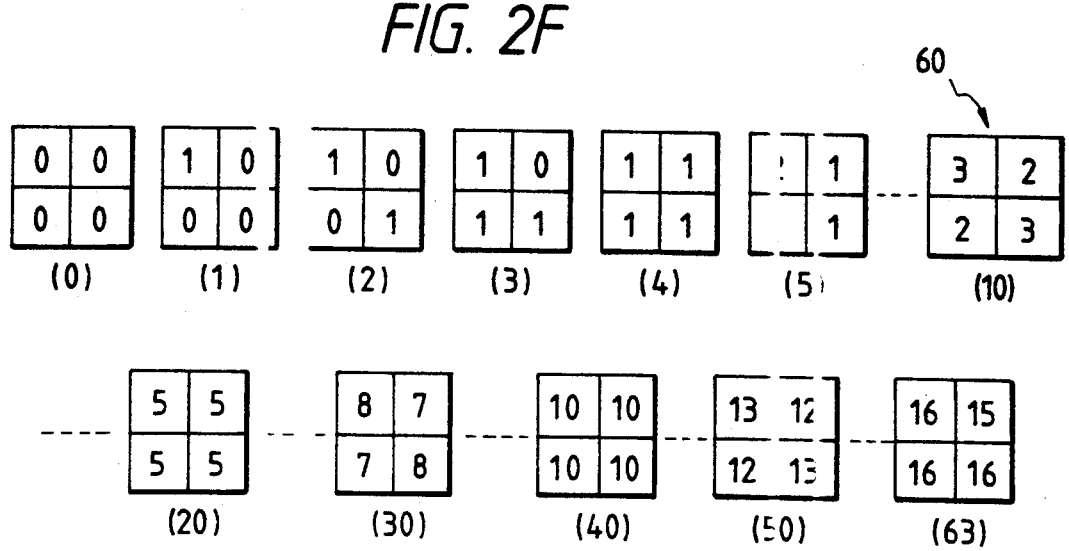
FIG. 2F is a view showing conversion matrixes.

FIG. 2F shows conversion data formed on the basis of the matrix shown in FIG. 2D in accordance with the harmonization level of the input picture element data. Referring to FIG. 2F, the harmonization level of an input picture element is written in parentheses below each matrix. Therefore, when the harmonization level of an input picture element is "10", data is converted into data represented by reference numeral 60 and output with four bits for each dot. Similar to the case of the sublimable ink sheet, the harmonization level of each dot is recorded under the control of the head driving pulse control circuit 44.

Figure 2G:
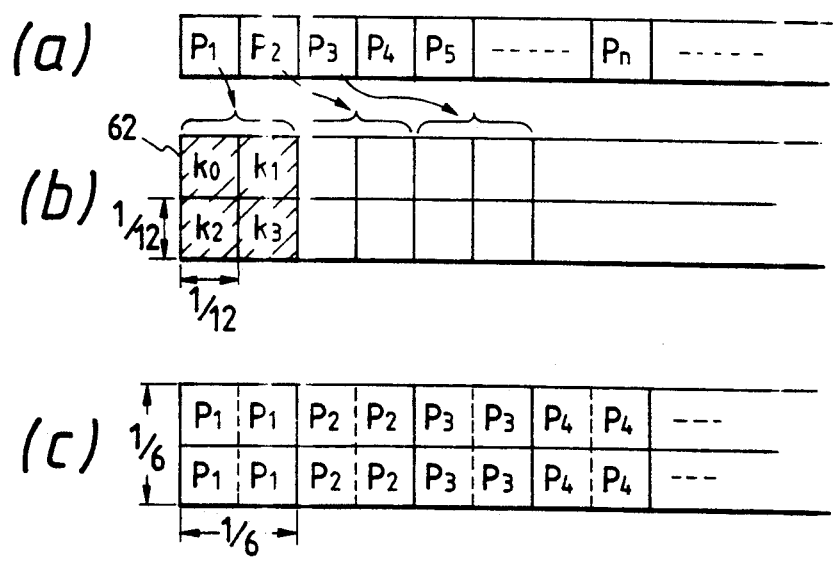
FIG. 2G is a view showing input picture elements and recorded states obtained when the respective sheets are used.

FIG. 2G shows a relationship between the input picture element data (P1 to Pn), a recording density obtained when the fusible ink sheet is used, and that obtained when the sublimable ink sheet is used.

Referring to FIG. 2G, (a) represents an input picture element data row in which P1 to Pn correspond to the respective picture elements. (b) represents dot data obtained by converting and recording input picture element data for the fusible ink sheet. That is, the picture element P1 is converted and recorded in a hatched portion 62. Dots $k_0$ to $k_3$ represent dot data obtained by converting the picture element P1 and correspond to the matrix shown in FIG. 2F. Each dot corresponds to each heating element 230 of the thermal head 130 of 12 picture elements. (c) represents a printing dot row for the sublimable ink sheet, in which one input picture element data is recorded to form two rows having two picture elements in the column direction, i.e., recorded by four dots (6 picture elements). Therefore, if sizes of input image picture data are the same, a recording size obtained by the fusible ink sheet becomes equal to that obtained by the sublimable ink sheet.

A heating method of the thermal head 130 of this embodiment will be described below.

Figure 9:
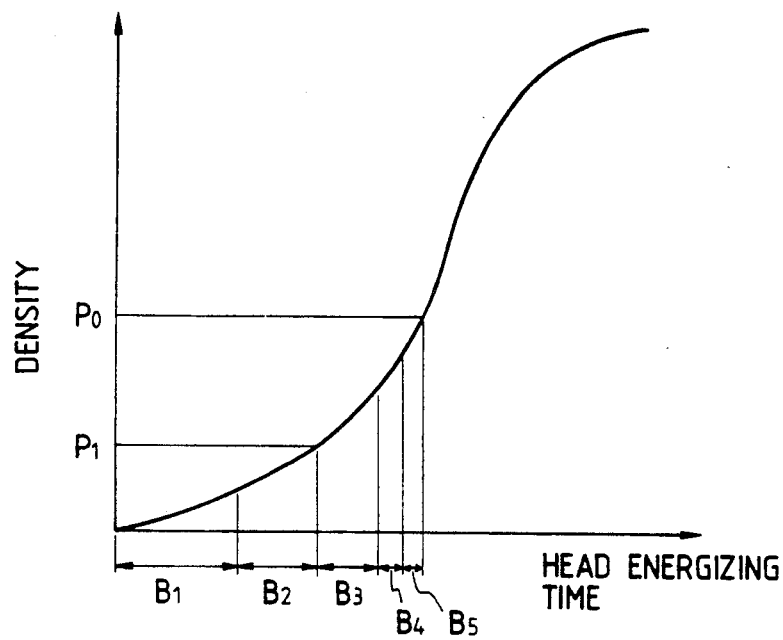
FIG. 9 is a graph showing a relationship between a head energizing time and an image density in the embodiment.
Figure 10:
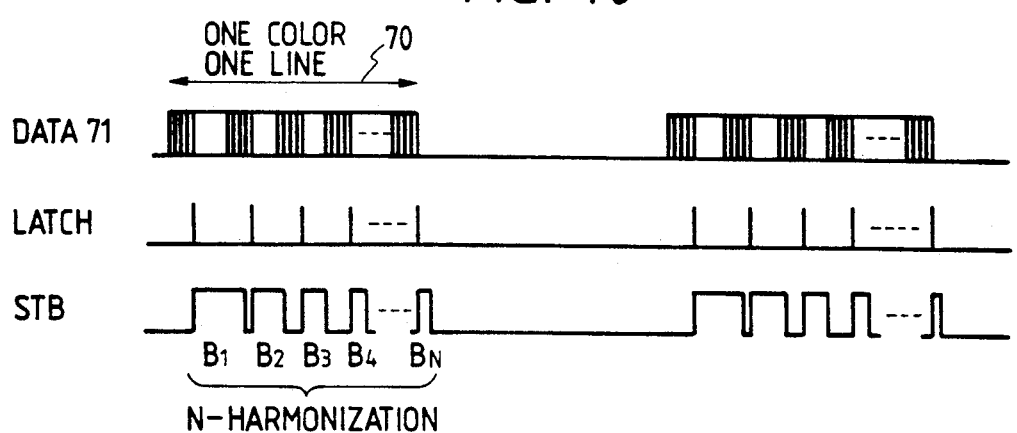
FIG. 10 is a timing chart showing waveforms of signal pulses for driving the thermal head in the printer unit of the embodiment.

FIG. 9 is a graph showing a relationship between a head energizing time and recording density obtained by the thermal head 130. Referring to FIG. 9, in order to obtain a density at $P_0$, the heating resistive elements 230 are energized for a time of $(B_1+B_2+B_3+B_4+B_5)$ As is apparent from FIG. 9, the energizing time of the head 130 is not proportional to its recording density. For example, in order to obtain a recording density at $P_1$, the head 130 must be energized for an energizing time of about $(B_1+B_2)$ FIG. 10 is a timing chart showing head driving and control pulses upon color image recording in the color printer having the energizing time-recording density characteristics as shown in FIG. 9.

In this case, the thermal head 130 is a line head, and reference numeral 70 denotes a data recording timing of one line. Assuming that image data of one picture element supplied to the harmonization conversion decoder 440 shown in FIG. 2A is constituted by six bits, 64 kinds of data can be made for each picture element. In this case, therefore, N of N-harmonization is "64". Harmonization data 444 with respect to the first STB signal of one-line data is transferred to the shift register 234 and latched by the latch circuit 233 in accordance with the latch signal 235. An STB signal $B_1$ is output and a heating element 230 from which data "1" is output is driven for the pulse width of the signal $B_1$.

During this driving, when the next data is supplied to the shift register 234 and the STB signal falls, data is latched by the latch circuit 233 in accordance with the latch signal 235. The STB signal is then output for a time interval of $B_2$. This operation is executed 64 times (i.e., for STB signals $B_1$ to $B_{64}$) to perform recording of one line.

That is, the harmonization conversion decoder 440 receives image data. When the value of the mth picture element data to be recorded of the image is "20", the harmonization conversion decoder 440 outputs data 71, in which each of the first 20 data is "1" and each of last 44 (64−20) data is "0", to the mth stage of the shift register 234 corresponding to the position of the picture element data 64 times (in the case of the sublimable ink sheet). It is a matter of course that data is set in another stage of the shift register 234 in accordance with a harmonization level of the corresponding picture element and output 16 times in the case of the fusible ink sheet 132a.

At this time, the pulse width of each strobe signal STB is changed in accordance with the number of output times of the STB signal as shown in FIG. 10 due to the reason explained with reference to FIG. 9. The strobe signal generating circuit 442 executes such pulse width adjustment for the STB signal. As described above, the strobe signal generating circuit 442 receives harmonization data corresponding to the kind of ink sheet 132 from the ROM table and adjusts the width, period, or the like of the STB signal 445 in accordance with the kind of ink sheet 132.

[Explanation of Operation of Color Printer (FIGS. 11A to 11C)]

Figure 11A:
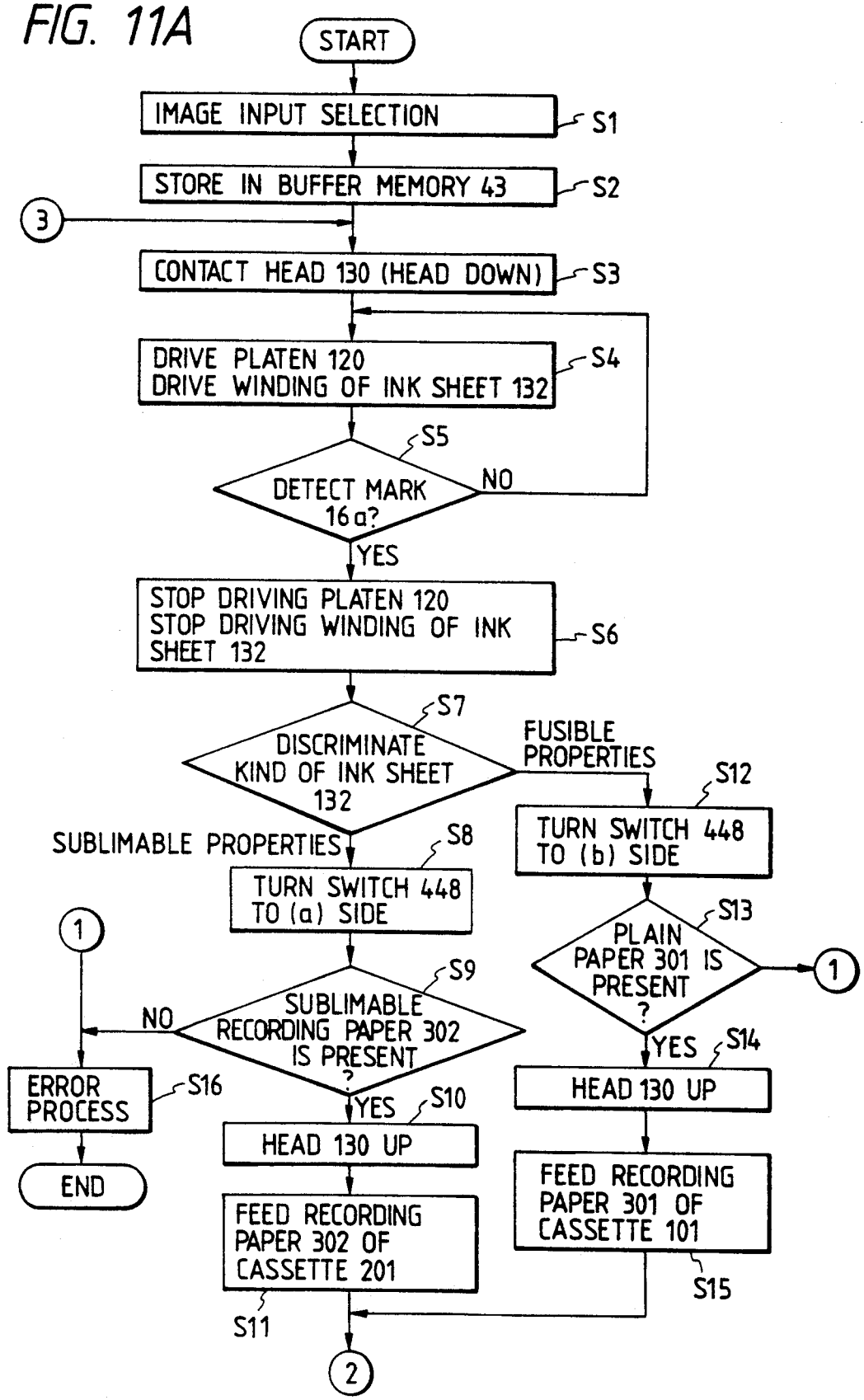
FIGS. 11A to 11C are flow charts for explaining recording process procedures in the color printer of the embodiment.

A color recording sequence will be described below with reference to flow charts shown in FIGS. 11A to 11C. Control programs represented by the flow charts are stored in the ROM of the CPU 24.

In step S1, selection of the image signal input terminals shown in FIG. 1A, i.e., determination of whether image data is to be input from the telephone line input terminal 31 or the video input terminal 36 is automatically or manually performed. In step S2, input color image data is stored in the buffer memory 43. In step S3, the thermal head 130 is brought into contact with the platen roller 120. At this time, by suitably charging the torsion coil spring 23 by the driving motor 131, an optimal urging force for thermal transfer printing is applied to the head 130 against the platen roller 120.

In step S4, driving of the platen roller 120 and winding of the ink sheet 132 are started, and detection of the initial position of the ink sheet 132 shown in FIG. 5 is performed. The phototransistors 136 for detecting signals from the corresponding photodiodes 135 constitute two pairs of photosensors (135-1 and 136-1, and 135-2 and 136-2) for detecting the marks 16a and 16b shown in FIG. 5, respectively. The ink sheet 132 is moved in the arrow direction shown in FIG. 5 until the phototransistor 136-1 outputs a detection signal.

When the mark 16a is detected by the phototransistor 136 in step S5, this means that the thermal head 130 and the ink sheet 132 are set in positions recordable with each other. Therefore, winding of the ink sheet 132 and driving of the platen roller 120 are stopped in step S6, and the mark 16b is detected by the photosensor 136-2 in step S7, thereby discriminating the kind of ink sheet 132. That is, if the mark 16b is detected by the reflecting photosensor (135-2 and 136-2), the flow advances from step S7 to S8 because the ink sheet 132 is the sublimable ink sheet 132b. If the photosensor (135-2 and 136-2) does not detect the mark 16b, the mounted ink sheet is discriminated to be the fusible ink sheet 132a, and the flow advances to step S12. The detected kind of ink sheet is stored in the RAM of the CPU and used in control to be described later.

In step S8, the switch 448 is changed over to the (a) side, and information representing that the mounted ink sheet is the sublimable sheet 132b is indicated on the indication unit 46. In step S9, whether recording paper for the sublimable ink sheet is stored in the cassette 201 is discriminated. If the sublimable ink recording paper 302 is stored in the cassette 201, the flow advances to step S9. The thermal head 130 is moved up and separated from the platen roller. In step S11, the pickup roller 203 or the separating rollers 204 and 205 are driven by the motor 206 to feed the recording paper 302 from the cassette 201 toward the platen roller 120.

If the fusible ink sheet 132a is discriminated, the switch 448 is changed over to the (b) side and information representing that the mounted ink sheet is the fusible ink sheet 132a is indicated on the indication unit 46, in step S12. In step S13, whether the plain paper 301 is stored in the cassette 101 is checked. If the plain paper 301 is stored, the flow advances to step S14. In step S14, the thermal head 130 is moved up, and the flow advances to step S15. In step S15, the pickup roller 103 and the separating rollers 104 and 105 are driven by the motor 106 to feed the plain paper 301 toward the platen roller 120. If the corresponding recording paper is not present in steps S9 and S13, an error process such as indication of information representing that no paper is present is performed. Note that in order to protect the ink sheet from being conveyed by rotation of the platen roller 120 upon detection of the initial position of the recording paper (steps S17 and S22) performed after the above paper feed operation, the head 130 is slightly separated from the platen roller 120 before paper feeding. Therefore, the ink sheet 132 is not fed together with the recording paper.

In step S17 (FIG. 11B), a rotational position of the platen roller 120 is detected by a rotational phase angle detector (not shown) of the platen roller 120. If it is determined in step S18 that the recording paper is set in a recordable position, the thermal head 130 is moved down and brought into contact with the platen roller 120. In step S20, a recording process shown in the flow chart of FIG. 11C is performed to record one page of one-color image data (Y data). At this time, as described above, an urging force acting on the head 130 against the platen roller 120 is controlled to be an optimal urging force for each ink sheet determined in accordance with the kind of ink sheet 132. After one page of one-color image data is recorded, the flow advances to step S21, and the paper guide lever 126 is displaced to the position indicated by the solid line in FIG. 1C.

In steps S22 and S23, the recording paper is conveyed again to the recording position by rotation of the platen roller 120. That is, on the basis of the rotation position of the platen roller 120, the platen roller 120 is rotated until the recording paper and the ink sheet 132 are conveyed to the recordable positions. In step S24, color recording of the next color is performed. Upon recording operation performed in steps S20 and S24, the strobe signal generating circuit 442 outputs the STB signal 445 corresponding to the mounted ink sheet 132, as described above. In this recording operation, recording is performed such that the ink sheet 132 is moved at the same moving speed as the recording paper after the recording paper reached the recordable point. If it is determined in step S25 that data recording for three colors Y, M, and C is completed, the flow advances to step S26.

In step S26, the exhaust lever 126 is turned off to be displaced to the position indicated by the dotted line in FIG. 1C. In step S27, the recorded paper is exhausted to the tray 125 by rotation of the platen roller 120. In step S28, rotation of the platen roller 120 is stopped. If it is determined in step S29 that continuous recording is to be performed, the flow returns to step S3, and the above operation is executed.

Figure 11B:
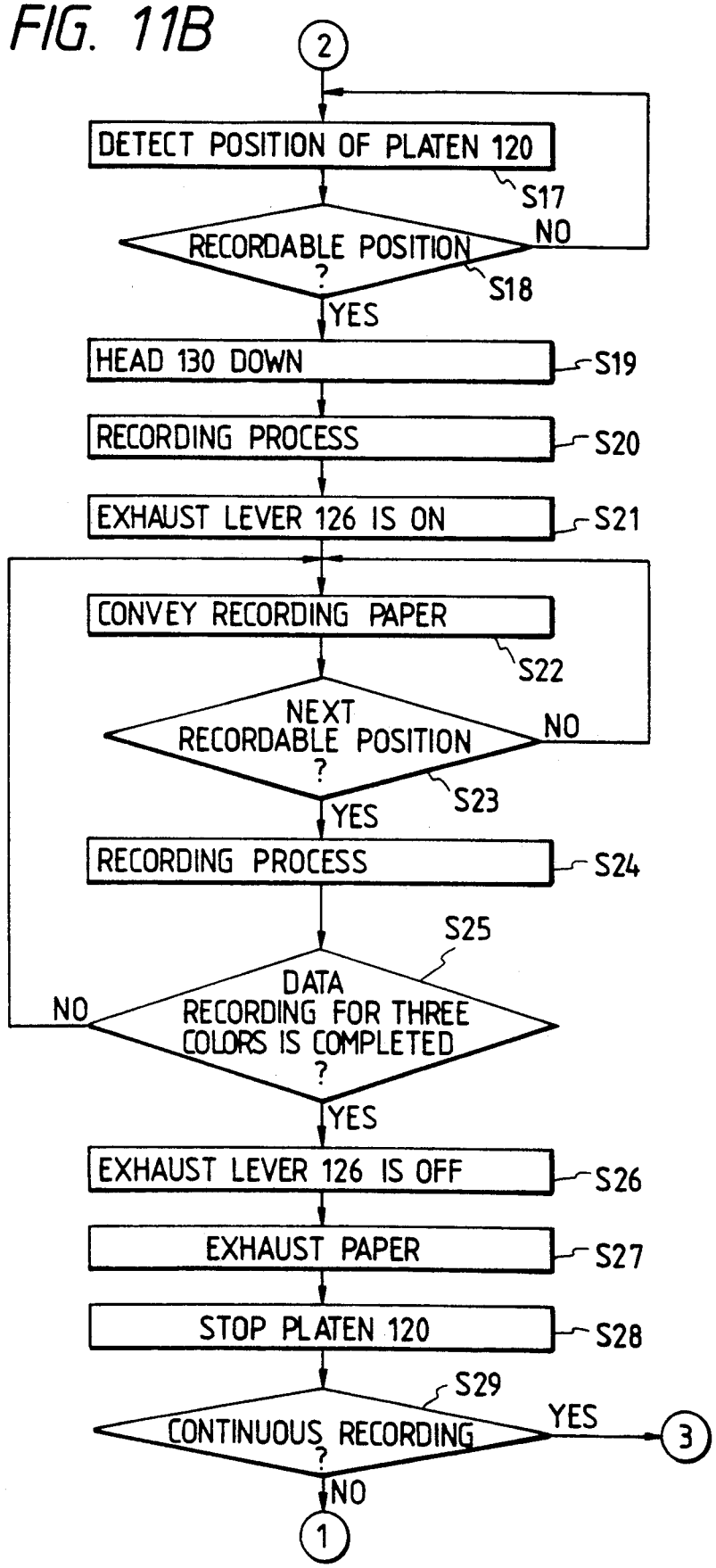
Figure 11C:
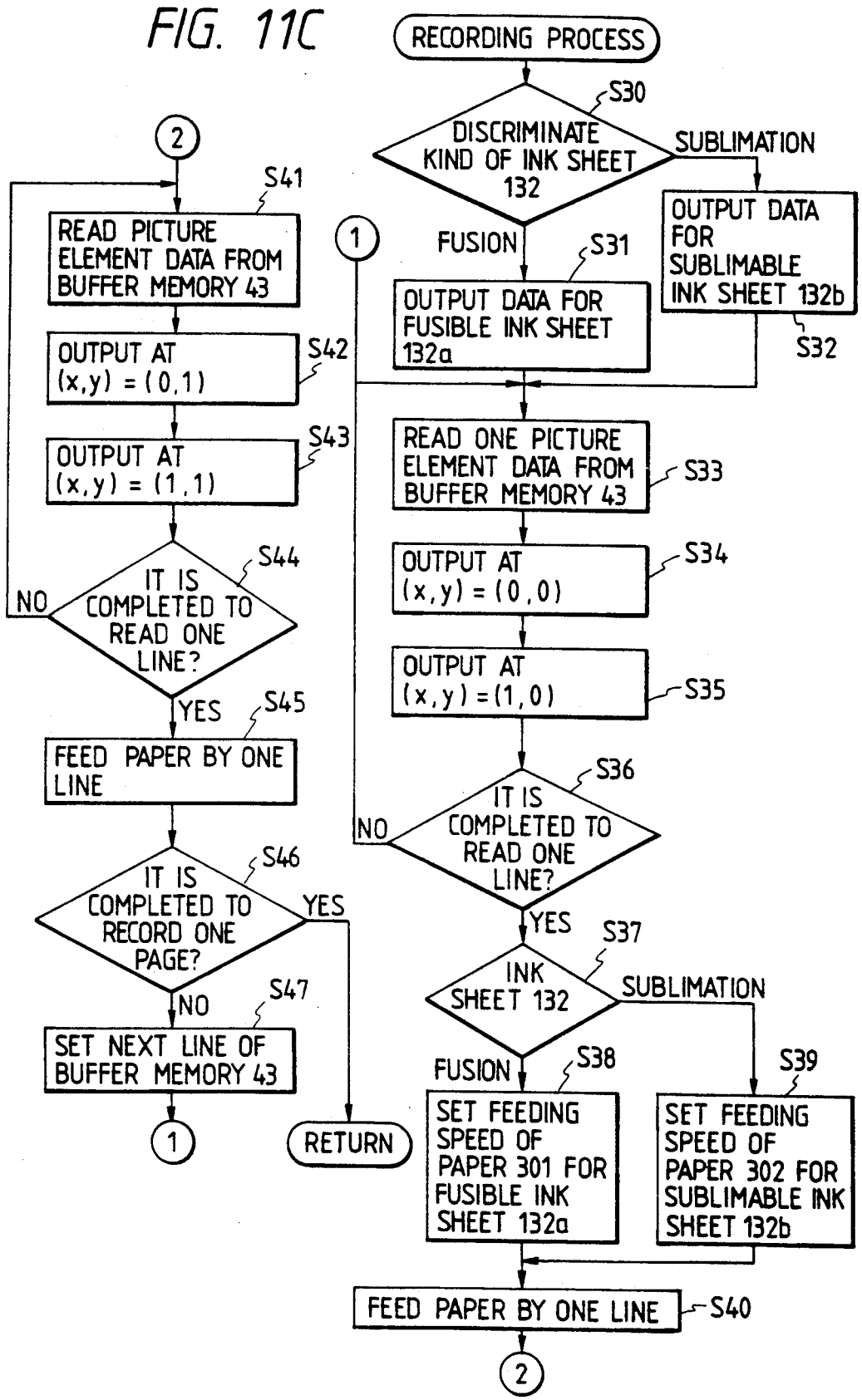

FIG. 11C shows a flow chart for explaining the recording process of this embodiment shown in steps S20 and S24 of FIG. 11B.

In step S30, the kind of mounted ink sheet is discriminated on the basis of information stored in the RAM of the CPU 42. If the fusible ink sheet 132a is discriminated, a 4-bit count is designated by a designation signal 61, and the fusible ink sheet data is read out from the conversion memory 52 by a designation signal 53, in step S31. If the sublimable ink sheet 132b is discriminated, the flow advances to step S32, and the designation signals 53 and 61 for the sublimable ink sheet are output. One-picture-element data is read out from the buffer memory 43 in step S33, an (x,y) address signal 54 is output at (0,0) in step S34, and the address signal 54 is output at (1,0) in step S35. In step S36, whether it is completed to read one line is checked, and steps S33 to S36 are executed until it is completed to read one line.

When recording of one line is completed, the flow advances to step S37, and the kind of mounted ink sheet is discriminated. In steps S38 and S39, a feeding speed of recording paper corresponding to the kind of ink sheet is set. In step S40, the recording paper is fed by one line at the speed corresponding to the kind of ink sheet. That is, the fusible ink sheet 132a requires only a shorter recording time than that of the sublimable ink sheet 132b, and a harmonization level of one dot of the fusible ink sheet is ¼ that of the sublimable ink sheet. Therefore, since the recording time of the fusible ink sheet 132a can be largely reduced as compared with that of the sublimable ink sheet 132b, the feeding speed of recording paper can be increased for the fusible ink sheet 132a.

In step S41, data of the same line as in step S33 is read out, and in steps S42 to S44, the second row of a dot matrix is recorded. After one line of the picture element data is recorded throughout two rows, the flow advances to step S45, and the recording paper is fed as in step S40. If it is determined in step S46 that it is not completed to record one page of the image data, the next read address of the buffer memory 43 is set in step S47, and the flow returns to step S33. Thereafter, the above process is executed until it is completed to record one page.

As described above, according to the above embodiment, the kind of mounted ink sheet is detected, and recording control corresponding to the sheet can be performed. Therefore, even if the fusible ink sheet is mounted, harmonization recording can be effectively performed.

In addition, the above embodiment has an effect of performing image recording of the same size regardless of the kind of ink sheet.

Another embodiment of the present invention will be described below.

Figure 13:
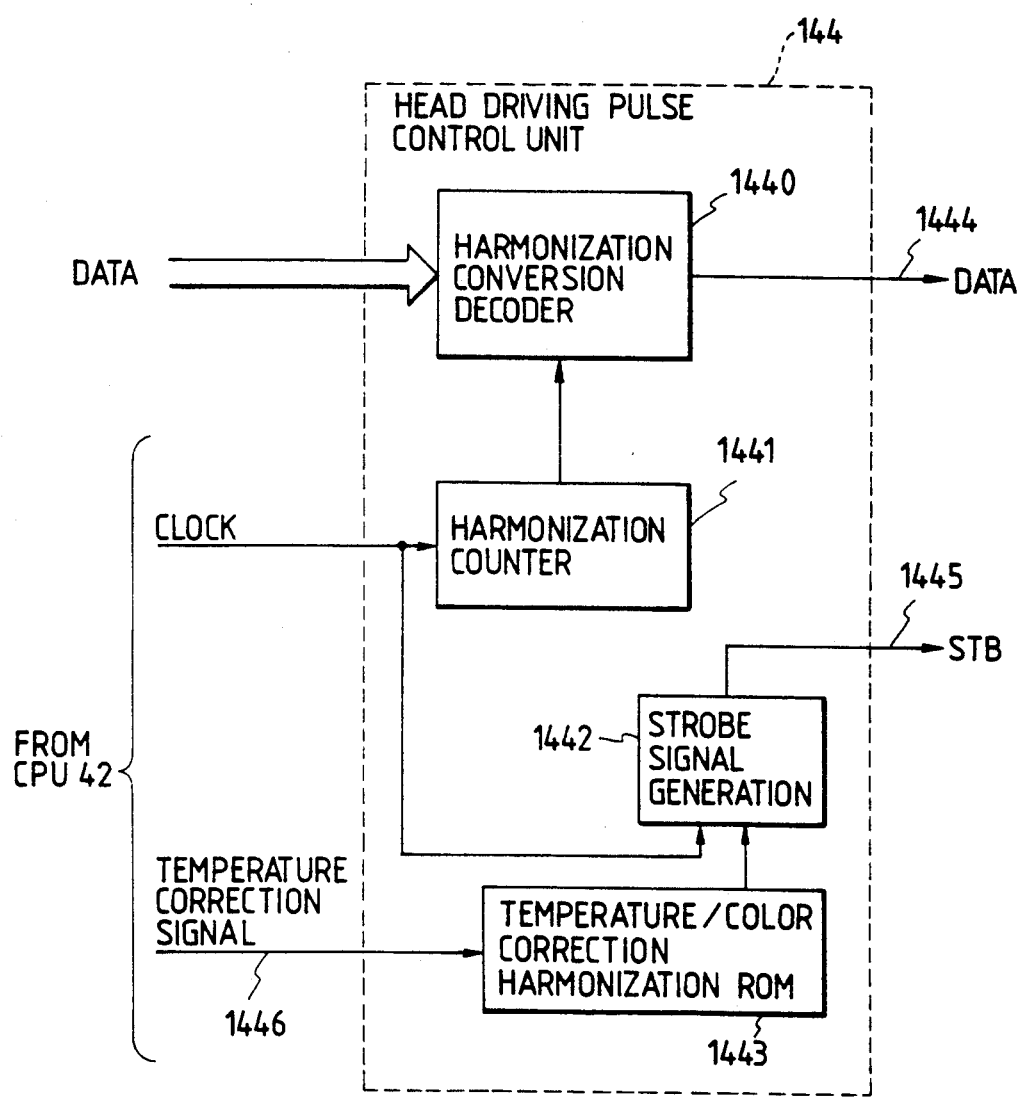
FIG. 13 is a block diagram showing in detail a head driving pulse control circuit shown in FIG. 12.

This embodiment can replace the above embodiment in order to discriminate whether an ink sheet mounted in an ink sheet mounting portion is a sublimable ink sheet or fusible ink sheet, and can be suitably used upon replacement. FIG. 12 is a block diagram showing an arrangement of a printer unit of the color printer shown in FIG. 1C, and FIG. 13 is a block diagram shown in detail a head driving pulse control circuit shown in FIG. 12. Note that in this embodiment, the same reference numerals as in the above embodiment denote the same parts, and a detailed description thereof will be omitted.

In a printer unit 41, image data output from an image processing unit 30 is sequentially stored in a buffer memory 43 in units of lines of an image to be recorded as shown in FIG. 7, temporarily held in the memory 43, and then output to a head driving pulse control circuit 144 in synchronism with a recording speed under the control of a CPU 42. The image data is output to a head driver 145.

The head driving pulse control circuit 144 has an arrangement shown in FIG. 13.

Referring to FIG. 13, a harmonization conversion decoder 1440 transfers harmonization data 1444 of each picture element in number corresponding to the number of harmonization levels to each register stage of a shift register 234 corresponding to each picture element. In order to process a color image, the harmonization conversion decoder 1440 performs harmonization conversion for each of Y, M, and C colors. At this time, recording is performed by a strobe signal STB 1445 supplied from a strobe signal generating circuit 1442. In FIG. 13, a temperature/color correction harmonization ROM table 1443 stores correction data for obtaining optimal harmonization characteristics for each color on the basis of a temperature correction signal 1446 from a head temperature detector 130a. A harmonization counter 1441 counts up each time a clock signal is supplied.

FIG. 14 is a block diagram showing still another embodiment of an arrangement of the printer unit. This embodiment can replace the above embodiment in order to discriminate whether an ink sheet mounted in an ink sheet mounted portion is a sublimable ink sheet or a fusible ink sheet and to indicate the discrimination result, and can be suitably used upon replacement. The embodiment shown in FIG. 14 is obtained by omitting the head driver 145 from the embodiment shown in FIG. 12. That is, in a printer unit 41, image data output from an image processing unit 30 is sequentially stored in a buffer memory 43 in units of lines of an image to be recorded as shown in FIG. 7, temporarily held in the memory 43, and then output to a head driving pulse control circuit 44 in synchronism with a recording speed under the control of a CPU 42. As will be described later, the CPU 42 discriminates the kind of ink sheet 132 and indicates the discrimination result, the presence/absence of recording paper, various error information, and the like on an indication unit 46.

An operation of the color printer of the embodiment in FIG. 14 will be described below. Flow charts shown in FIGS. 15A and 15B correspond to a sequence of color recording.

In step S1, selection of the image signal input terminals shown in FIG. 1A, i.e., determination of whether image data is to be input from a telephone line input terminal 31 or a video input terminal 36 is automatically or manually performed. In step S2, the input color image data is stored in an RGB memory 38. In step S3, a thermal head 130 is brought into contact with a platen roller 120 in order to detect a mark 16a. At this time, by properly charging a torsion coil spring 23 by a drive motor 131, an urging force optimal for thermal transfer printing is applied on the head 130 against the platen roller 120.

In step S4, driving of the platen roller 120 and winding of the ink sheet 132 are started to detect an initial position of the ink sheet 132 shown in FIG. 5. Phototransistors 136 for detecting signals from photodiodes 135 constitute pairs of photosensors (135-1 and 136-1, and 135-2 and 136-2) for detecting the mark 16a and a mark 16b shown in FIG. 5, respectively. The ink sheet 132 is moved in the direction indicated by the arrow shown in FIG. 5 until the phototransistor 136-1 outputs a detection signal in step S5.

If the mark 16a is detected by the phototransistor 136 in step S5, this means that the thermal head 130 and the ink sheet 132 are set in recordable positions. Therefore, in step S6, winding of the ink sheet 132 and driving of the platen roller 120 are stopped. In step S7, detection of the mark 16b is performed by the photosensor (135-2 and 136-2), thereby discriminating the kind of ink sheet 132. That is, if the mark 16b is detected by the photosensor (135-2 and 36-2), the flow advances from step S7 to S8 since the ink sheet 132 is a sublimable ink sheet. If the mark 16b is not detected by the photosensor (135-2 and 136-2), the flow advances to step S11 since the ink sheet 132 is a fusible ink sheet.

In step S8, whether recording paper for a sublimable ink sheet is stored in the cassette 201 is checked. If the sublimable ink recording paper is stored in the cassette 201, the flow advances to step S9, and the thermal head 130 is moved up. In step S10, the pickup roller 203 and the separating rollers 204 and 205 are driven by the motor 206 to feed the recording paper from the cassette 201 toward the platen roller 120. If the fusible ink sheet is detected, whether plain paper is stored in the cassette 101 is checked. If the plain paper is stored, the flow advances to step S12, and the thermal head 130 is removed from the platen roller 120. In step S13, the pickup roller 103 and the separating rollers 104 and 105 are driven by the motor 106 to feed the plain paper toward the platen roller 120. If the corresponding recording paper is not present in steps S8 and S11, the flow advances to step S14, and an error process such as indication of information representing that no paper is present is performed.

In order to protect the sheet 132 from being fed by rotation of the platen roller 120 before the paper feed operation in steps S10 and S13 and upon detection of an initial position of the recording paper to be described below, the head 130 is slightly separated from the platen roller 120 so that the ink sheet 132 is not fed by rotation of the platen roller 120.

In step S15, a rotational position of the platen roller 120 is detected by its rotational phase angle detector. If it is determined in step S16 that the recording paper is set in a recordable position, the head 130 is brought into contact with the platen roller 120 in step S17, and a recording operation is started in step S18, thereby recording one-color data of one line. At this time, an urging force on the head 130 is set to be an optimal urging force determined in accordance with the kind of ink sheet 132.

In step S19, whether recording of image data (Y data) of one color is completed is checked. If recording is not completed, the flow returns to step S18, and a predetermined amount of the ink sheet 132 is wound to record image data of the next line. If it is determined in step S19 that recording of image data of one color is completed, the flow advances to step S20. In step S20, the exhaust lever driven, and the paper guide lever 126 is displaced to the position indicated by the solid line in FIG. 1C.

In this manner, in steps S21 and S22, the recording paper is fed to the recording position again by rotation of the platen roller 120. That is, on the basis of the rotational position of the platen roller 120, the platen roller 120 is rotated until the recording paper and the ink sheet 132 are fed to the recordable position. Then, color recording is performed in step S23. In this recording operation, recording is performed such that the ink sheet 132 is moved at the same moving speed as the recording paper after the recording paper is set in the recordable position. If it is determined in step S24 that recording for data of three colors Y, M, and C is completed, the flow advances to step S25.

In step S25, the exhaust lever 126 is turned off to be displaced to the position indicated by the dotted line in FIG. 1C. In step S26, the recorded paper is exhausted to the tray 125 by rotation of the platen roller 120. In step S27, rotation of the platen roller 120 is stopped. If continuous recording is determined in step S28, the flow returns to step S3 to perform the above operation.

As described above, according to this embodiment, the kind of ink sheet can be easily detected.

In addition, as shown in FIG. 16, step S7A for indicating that the ink sheet is sublimable and step S7B for indicating that the ink sheet is fusible may be inserted between steps S7 and S8 and steps S7 and S11 shown in FIG. 15A, respectively.

In the above embodiments, a recording medium (such as plain paper, processed paper, or plastic for OHP) is fed from a cassette. However, the present invention is not limited to the above embodiments. For example, a recording medium supported as a deck or roll may be fed.

Furthermore, a harmonization recording method is not limited to that described in the above embodiments but can be any of conventional methods.

As has been described above, the present invention can provide a recording apparatus which can perform clear recording.

What is claimed is:

1. A recording apparatus for performing recording on a recording medium, comprising:
    a mounting unit for detachably mounting an ink sheet;
    discriminating means for discriminating a kind of ink sheet mounted in said mounting unit;
    recording means for performing recording on a kind of recording medium corresponding to a discriminated kind of ink sheet, said recording means comprising a thermal head including a plurality of heating elements;
    means for supplying the corresponding kind of recording medium to said recording means; and
    control means for performing drive control of said heating elements on a basis of a discrimination result of said discriminating means,
    said control means dividing input data of one picture element into a plurality of dots corresponding to said heating elements of said thermal head and determining a gradation level of each of the dots in accordance with a gradation level of the input data of one picture element when a fusible ink sheet is mounted, and
    said control means assigning a plurality of dots to input data of one picture element and determining gradation levels of said plurality of dots in accordance with a gradation level of the picture element data when a sublimable ink sheet is mounted.

2. An apparatus according to claim 1, wherein the recording medium on which recording is performed comprises recording paper having an ink receiving layer when the discriminated ink sheet is a sublimable ink sheet.

3. An apparatus according to claim 1, wherein the recording medium on which recording is performed comprises plain paper when the discriminated ink sheet is a fusible ink sheet.

4. A thermal recording apparatus for performing reading by way of an ink sheet by a thermal transfer method, comprising:
    discriminating means for discriminating whether a mounted ink sheet is a fusible ink sheet having a fusible ink or a sublimable ink sheet having a sublimable ink;
    first gradation determining means for dividing input data of one picture element into a plurality of dots corresponding to heating elements of a thermal head and for determining a gradation level of each of the dots in accordance with a gradation level of the input data of one picture element when said discriminating means discriminates that said fusible ink sheet is mounted;
    second gradation determining means for assigning a plurality of dots to the input data of one picture element and determining gradation levels of said plurality of dots in accordance with a gradation level of the input picture element data when said discriminating means discriminates that the sublimable ink sheet is mounted;
    recording means for driving said heating elements of said thermal head to perform recording on a kind of recording medium corresponding to a discriminated kind of ink sheet in accordance with the gradation level of each dot determined by said first and second gradation determining means; and
    means for supplying the corresponding kind of recording medium to thermal head.

5. An apparatus according to claim 4, wherein said plurality of dots are constituted by an n×n dot matrix, each dot of said dot matrix being set at a gradation level of input data of one picture element when said sublimable ink sheet is to be used and having a gradation level $1/n^2$ that of said sublimable ink sheet when said fusible ink sheet is to be recorded.

6. An apparatus according to claim 4, wherein the recording medium on which recording is performed comprises recording paper having an ink receiving layer when the discriminated ink sheet is a sublimable ink sheet.

7. An apparatus according to claim 4, wherein the recording medium on which recording is performed comprises plain paper when the discriminated ink sheet is a fusible ink sheet.

8. A recording method for performing recording on a recording medium, said method comprising the steps of:
    mounting a detachable ink sheet;
    discriminating a kind of ink sheet mounted in said mounting step;
    performing recording on a kind of recording medium corresponding to a discriminated kind of ink sheet, using a thermal head including a plurality of heating elements;
    supplying the corresponding kind of recording medium to the thermal head; and
    performing drive control of the heating elements on a basis of a discrimination result in said discriminating step,
    said control step including dividing input data of one picture element into a plurality of dots corresponding to the heating elements of the thermal head and determining a gradation level of each of the dots in accordance with a gradation level of the input data of one picture element when a fusible ink sheet is mounted, and
    said control step including assigning a plurality of dots to input data of one picture element and determining gradation levels of the plurality of dots in accordance with a gradation level of the picture element data when a sublimable ink sheet is mounted.

9. A method according to claim 8, wherein the recording medium on which recording is performed comprises recording paper having an ink receiving layer when the discriminated ink sheet is a sublimable ink sheet.

10. A method according to claim 8, wherein the recording medium on which recording is performed comprises plain paper when the discriminated ink sheet is a fusible ink sheet.

* * * * *

UNITED STATES PATENT AND TRADEMARK OFFICE
CERTIFICATE OF CORRECTION

PATENT NO. : 5,274,395     Page 1 of 3
DATED : December 28, 1993
INVENTOR(S) : Yoshiyuki MIZOGUCHI, et al.

It is certified that error appears in the above-indentified patent and that said Letters Patent is hereby corrected as shown below:

Title page, item
  [57] ABSTRACT:

Line 8, "control control" should read --control--.

COLUMN 1:

Line 6, "continuation-in-part" should read --continuation--;
     Line 15, "includes" should read --include--.

COLUMN 4:

Line 34, "132 (a;b)" should read --132 (a,b)--;
     Line 68, "101;" should read --101,--.

COLUMN 5:

Line 1, "201;" should read --201,--;
     Line 2, "cassette;" should read --cassette,--;
     Line 32, "level 126" should read --lever 126--;
     Line 63, "via" should be deleted.

UNITED STATES PATENT AND TRADEMARK OFFICE
CERTIFICATE OF CORRECTION

PATENT NO. : 5,274,395
DATED : December 28, 1993
INVENTOR(S) : Yoshiyuki MIZOGUCHI, et al.

It is certified that error appears in the above-indentified patent and that said Letters Patent is hereby corrected as shown below:

COLUMN 8:

Line 9, "135;136" should read --(135, 136)--;
Line 12, "sheet 132" should read --sheet 132.--;
Line 13, "(135;136)" should read --(135, 136)--;
Line 21, "driven" should read --driven.--.

COLUMN 9:

Line 47, "applying" should read --applied--;
Line 50, "applying" should read --applied--;
Line 53, "applying" should read --applied--.

COLUMN 10:

Line 11, "X and y axes" should read --Axes x and y--.

UNITED STATES PATENT AND TRADEMARK OFFICE
CERTIFICATE OF CORRECTION

PATENT NO. : 5,274,395  Page 3 of 3
DATED : December 28, 1993
INVENTOR(S) : Yoshiyuki MIZOGUCHI, et al.

It is certified that error appears in the above-indentified patent and that said Letters Patent is hereby corrected as shown below:

COLUMN 16:

Line 44, "driven," should read --is driven,--.

COLUMN 18:

Line 16, "to thermal head" should read --to the thermal head--.

Signed and Sealed this

Ninth Day of August, 1994

Attest:

BRUCE LEHMAN

Attesting Officer      Commissioner of Patents and Trademarks